(12) United States Patent
Jin et al.

(10) Patent No.: US 12,494,319 B2
(45) Date of Patent: Dec. 9, 2025

(54) MAGNETIC DEVICE AND POWER CONVERTER WITH SAME

(71) Applicant: Delta Electronics, Inc., Taoyuan (TW)

(72) Inventors: Da Jin, Taoyuan (TW); Kuojun Fan, Taoyuan (TW); Junguo Cui, Taoyuan (TW); Shengli Lu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 914 days.

(21) Appl. No.: 17/677,794

(22) Filed: Feb. 22, 2022

(65) Prior Publication Data

US 2022/0293334 A1 Sep. 15, 2022

Related U.S. Application Data

(63) Continuation-in-part of application No. 17/588,026, filed on Jan. 28, 2022.

(30) Foreign Application Priority Data

| Mar. 9, 2021 | (CN) | .......................... | 202110256802.9 |
| May 7, 2021 | (CN) | .......................... | 202110495040.8 |
| Nov. 11, 2021 | (CN) | .......................... | 202111333821.3 |

(51) Int. Cl.
*H01F 27/29* (2006.01)
*H01F 3/14* (2006.01)
(Continued)

(52) U.S. Cl.
CPC ............ *H01F 27/306* (2013.01); *H01F 3/14* (2013.01); *H01F 27/263* (2013.01); *H01F 27/29* (2013.01); *H01F 27/38* (2013.01); *H02M 1/0064* (2021.05)

(58) Field of Classification Search
CPC ........ H01F 27/306; H01F 3/14; H01F 27/263; H01F 27/29; H01F 27/38; H01F 27/34;
(Continued)

(56) References Cited

U.S. PATENT DOCUMENTS 6,060,977 A * 5/2000 Yamamoto .......... H01F 17/0006
336/200
6,377,155 B1 * 4/2002 Allen ................... H01H 50/005
336/200
(Continued)

FOREIGN PATENT DOCUMENTS

CN 2629393 Y 7/2004
CN 102881404 A 1/2013
(Continued)

*Primary Examiner* — Tuyen T Nguyen
(74) *Attorney, Agent, or Firm* — KIRTON McCONKIE; Evan R. Witt

(57) ABSTRACT

A magnetic device includes two common magnetic legs, a plurality of coupled magnetic legs, and two windings. The first winding includes a first input part, a first intermediate part and a first output part. The second winding includes a second input part, a second intermediate part and a second output part. The first input part is disposed between the first common magnetic leg and the first coupled magnetic leg. The second input part is disposed between the second common magnetic leg and the first coupled magnetic leg. The first intermediate part and the second intermediate part are disposed between every two adjacent coupled magnetic legs. The first output part is disposed between the first common magnetic leg and the last coupled magnetic leg. The second output part is disposed between the second common magnetic leg and the last coupled magnetic leg.

27 Claims, 15 Drawing Sheets

(51) Int. Cl.
*H01F 27/26* (2006.01)
*H01F 27/30* (2006.01)
*H01F 27/38* (2006.01)
*H02M 1/00* (2006.01)

(58) Field of Classification Search
CPC ......... H01F 27/2847; H01F 2027/2809; H01F 27/24; H01F 2003/106; H02M 1/0064; H02M 3/33576; H02M 3/1586
USPC .............................. 336/65, 83, 200, 212, 232
See application file for complete search history.

(56) References Cited

U.S. PATENT DOCUMENTS

| | | |
|---|---|---|
| 7,612,640 B2 | 11/2009 | Sano |
| 9,767,947 B1 * | 9/2017 | Ikriannikov .............. H01F 5/04 |
| 12,334,249 B2 * | 6/2025 | Lu ........................... H01F 27/32 |
| 2006/0181252 A1 | 8/2006 | Yoshida et al. |
| 2006/0187684 A1 | 8/2006 | Chandrasekaran et al. |
| 2011/0286144 A1 | 11/2011 | Ikriannikov |
| 2013/0207766 A1 | 8/2013 | Kim et al. |
| 2016/0086723 A1 | 3/2016 | Su et al. |
| 2017/0278622 A1 | 9/2017 | Chen et al. |
| 2019/0148061 A1 | 5/2019 | Lu et al. |

FOREIGN PATENT DOCUMENTS

| | | |
|---|---|---|
| CN | 103003896 A | 3/2013 |
| CN | 103107704 A | 5/2013 |
| CN | 104240912 A | 12/2014 |
| CN | 208706394 U | 4/2019 |
| CN | 209343913 U | 9/2019 |
| CN | 111478587 A | 7/2020 |
| CN | 112038052 A | 12/2020 |
| CN | 112712980 A | 4/2021 |

* cited by examiner

MAGNETIC DEVICE AND POWER CONVERTER WITH SAME

CROSS-REFERENCE TO RELATED APPLICATION

This application claims priority to China Patent Application No. 202110495040.8, filed on May 7, 2021. This application also claims priority to China Patent Application No. 202110256802.9, filed on Mar. 9, 2021. This application also claims priority to China Patent Application No. 202111333821.3, filed on Nov. 11, 2021. This application is a continuation-in-part application of U.S. application Ser. No. 17/588,026 filed on Jan. 28, 2022, and entitled "POWER CONVERSION MODULE AND MAGNETIC DEVICE THEREOF". The entire contents of the above-mentioned patent applications are incorporated herein by reference for all purposes.

FIELD OF THE INVENTION

The present disclosure relates to a magnetic device and a power converter with the magnetic device, and more particularly to a slim-type magnetic device and a power converter with the magnetic device.

BACKGROUND OF THE INVENTION

Generally, a two-phase interleaved parallel-connected buck converter has the advantages of small output current ripple, small output filter volume and large system output power. Consequently, the two-phase interleaved parallel-connected buck converter is widely used in power converters. The two-phase interleaved parallel-connected buck converter uses magnetic elements, i.e., coupled inductors. Consequently, the ripple amplitude of the output current from the power converter can be further reduced, and the dynamic response characteristics of the power converter can be enhanced.

FIG. 1 schematically illustrates a magnetic device used in a conventional interleaved parallel-connected buck converter. The magnetic device 1 includes two middle legs 11 and two windings 12. There is a single overlap region between the two windings 12. The overlap region is arranged between the two middle legs 11. Moreover, after 50% of the respective AC magnetic fluxes generated by the two windings 12 are cancelled out at the overlap region, the AC magnetic fluxes pass through the middle legs 11 in a closed loop.

When the interleaved parallel-connected buck converter is applied to the occasions where the amplitude of the output voltage is high and the frequency is low, the two windings 12 of the magnetic device 1 will be subjected to high volt-second products. Consequently, the core loss of the two middle legs 11 of the magnetic device 1 will be increased. In order to reduce the core loss of the two middle legs 11 of the magnetic device 1, it is necessary to increase the cross-sectional areas of the middle legs 11. Correspondingly, the thicknesses of the top magnetic cover and the bottom magnetic covers are increased. Under this circumstance, it is impossible to reduce the thickness and thermal resistance of the power converter.

SUMMARY OF THE INVENTION

An object of the present disclosure provides a slim-type magnetic device and a power converter with the magnetic device.

In accordance with an aspect of the present disclosure, a magnetic device is provided. The magnetic device includes a first common magnetic leg, a second common magnetic leg, a first coupled magnetic leg, a second coupled magnetic leg, a third coupled magnetic leg, a first winding and a second winding. The second common magnetic leg is opposed to the first common magnetic leg. The first coupled magnetic leg, the second coupled magnetic leg and the third coupled magnetic leg are discretely disposed between the first common magnetic leg and the second common magnetic leg. The second coupled magnetic leg is disposed between the first coupled magnetic leg and the third coupled magnetic leg. The first winding includes a first input part, at least one first intermediate part and a first output part, which are connected with each other sequentially. The first input part is disposed between the first common magnetic leg and the first coupled magnetic leg. The at least one first intermediate part is disposed between the first coupled magnetic leg and the second coupled magnetic leg, between the second common magnetic leg and the second coupled magnetic leg, and between the second coupled magnetic leg and the third coupled magnetic leg. The first output part is disposed between the first common magnetic leg and the third coupled magnetic leg. The second winding includes a second input part, at least one second intermediate part and a second output part, which are connected with each other sequentially. The second input part is disposed between the second common magnetic leg and the first coupled magnetic leg. The at least one second intermediate part is disposed between the first coupled magnetic leg and the second coupled magnetic leg, between the first common magnetic leg and the second coupled magnetic leg, and between the second coupled magnetic leg and the third coupled magnetic leg. The second output part is disposed between the second common magnetic leg and the third coupled magnetic leg.

In accordance with another aspect of the present disclosure, a magnetic device is provided. The magnetic device includes a first magnetic cover, a second magnetic cover, a first common magnetic leg, a second common magnetic leg, N coupled magnetic legs, a first winding and a second winding. The first common magnetic leg is disposed between the first magnetic cover and the second magnetic cover. The second common magnetic leg is opposed to the first common magnetic leg, and the second common magnetic leg is disposed between the first magnetic cover and the second magnetic cover. The N coupled magnetic legs are discretely disposed between the first common magnetic leg and the second common magnetic leg. The N coupled magnetic legs are disposed between the first magnetic cover and the second magnetic cover, wherein N is an integer greater than or equal to 3. The first winding is disposed between every two adjacent coupled magnetic legs, disposed between every even-numbered coupled magnetic leg and the second common magnetic leg, and disposed between every odd-numbered coupled magnetic leg and the first common magnetic leg. The first winding includes a first input part, at least one first intermediate part and a first output part, which are connected with each other sequentially. The first input part is disposed between the first common magnetic leg and a first coupled magnetic leg of the N coupled magnetic legs. The at least one first intermediate part is connected between the first input part and the first output part. When N is odd, the first output part is disposed between an N-th coupled magnetic leg of the N coupled magnetic legs and the first common magnetic leg. When N is even, the first output part is disposed between the N-th coupled magnetic leg of the N coupled magnetic legs and the second common magnetic leg. The second winding is disposed between every two adjacent coupled magnetic legs, disposed between every odd-numbered coupled magnetic leg and the second common magnetic leg, and disposed between every even-numbered coupled magnetic leg and the first common magnetic leg. The second winding includes a second input part, at least one second intermediate part and a second output part, which are connected with each other sequentially. The second input part is disposed between the second common magnetic leg and the first coupled magnetic leg, and the at least one second intermediate part is connected between the second input part and the second output part. When N is odd, the second output part is disposed between the N-th coupled magnetic leg of the N coupled magnetic legs and the second common magnetic leg. When N is even, the second output part is disposed between the N-th coupled magnetic leg of the N coupled magnetic legs and the first common magnetic leg.

In accordance with another aspect of the present disclosure, a power converter is provided. The power converter includes the magnetic device having a structure as described above, a first half-bridge arm and a second half-bridge arm. A midpoint of the first half-bridge arm is connected to the first input part of the first winding. A midpoint of the second half-bridge arm is connected to the second input part of the second winding.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
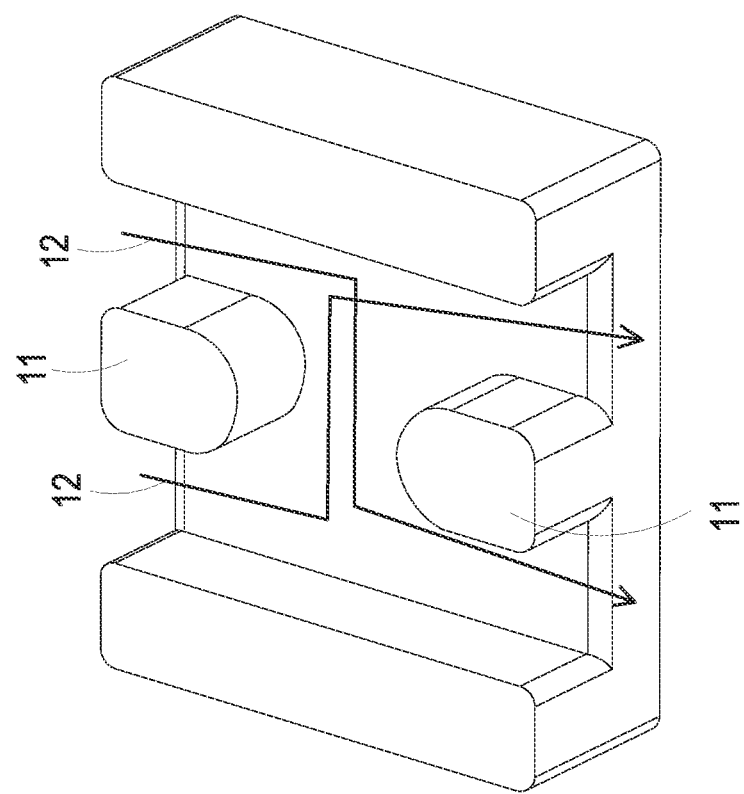
FIG. 1 schematically illustrates a magnetic device used in a conventional interleaved parallel-connected buck converter.
Figure 2:
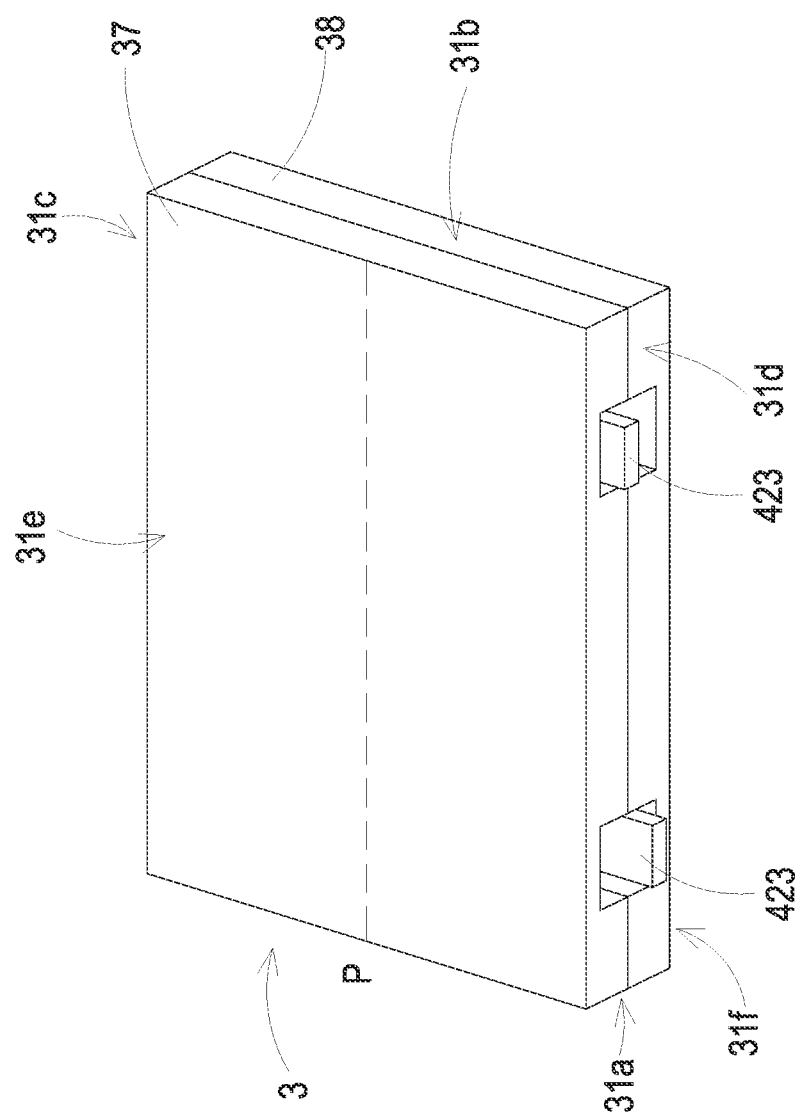
FIG. 2 is a schematic perspective view illustrating the structure of a magnetic device according to a first embodiment of the present disclosure.
Figure 3:
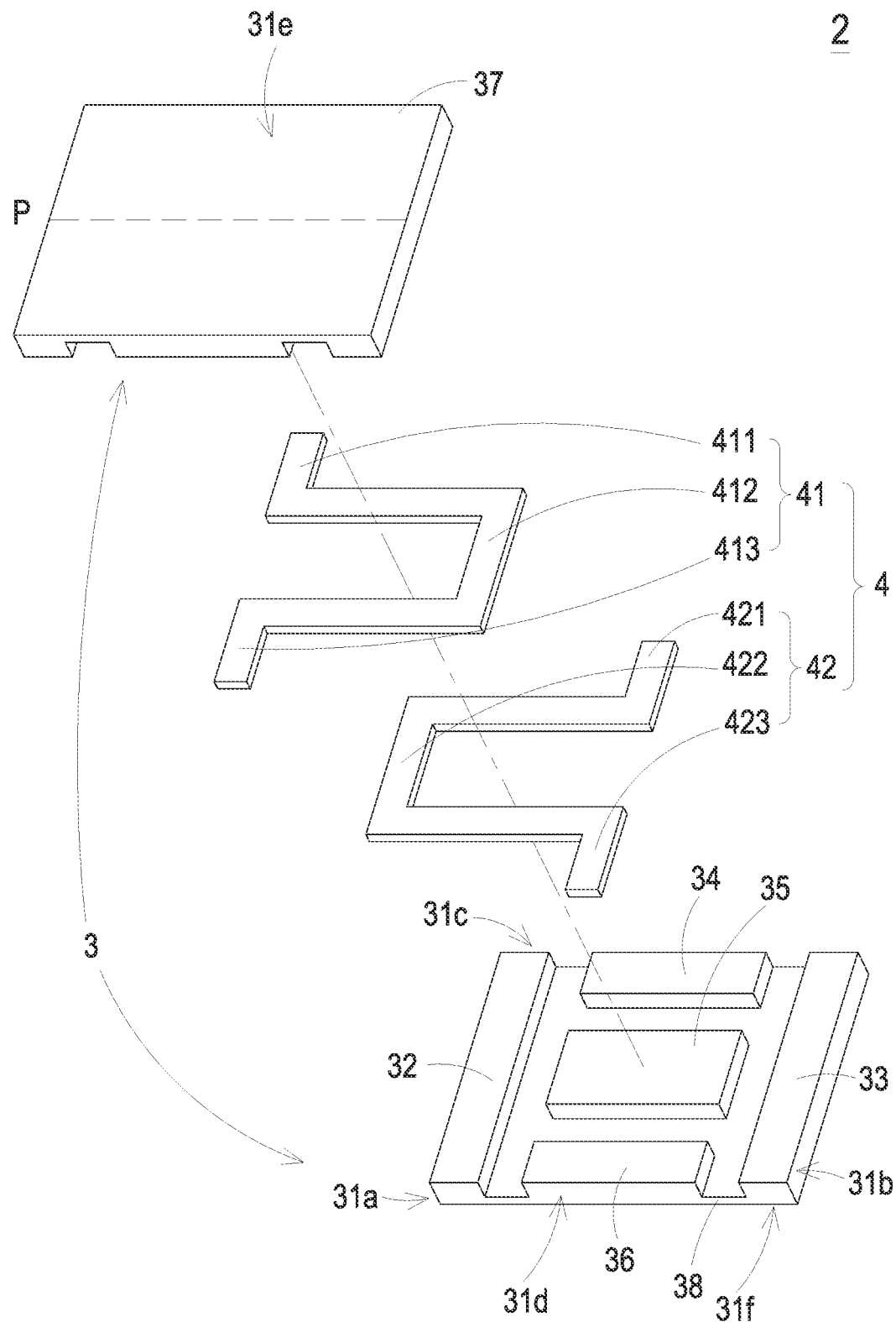
FIG. 3 is a schematic exploded view illustrating the magnetic device as shown in FIG. 2.

Please refer to FIGS. 2 and 3. FIG. 2 is a schematic perspective view illustrating the structure of a magnetic device according to a first embodiment of the present disclosure. FIG. 3 is a schematic exploded view illustrating the magnetic device as shown in FIG. 2. In this embodiment, the magnetic device 2 includes a magnetic core assembly 3 and a winding assembly 4. The magnetic core assembly 3 and the winding assembly 4 are collaboratively formed as an inductor.

The magnetic core assembly 3 has a first lateral side 31a, a second lateral side 31b, a third lateral side 31c, a fourth lateral side 31d, a fifth lateral side 31e and a sixth lateral side 31f. The first lateral side 31a and the second lateral side 31b are opposed to each other. The third lateral side 31c and the fourth lateral side 31d are opposed to each other. In addition, the third lateral side 31c and the fourth lateral side 31d are disposed between the first lateral side 31a and the second lateral side 31b. The fifth lateral side 31e and the sixth lateral side 31f are opposed to each other. In addition, the fifth lateral side 31e and the sixth lateral side 31f are disposed between the first lateral side 31a, the second lateral side 31b, third lateral side 31c and the fourth lateral side 31d.

In an embodiment, the magnetic core assembly 3 includes a first common magnetic leg 32, a second common magnetic leg 33, a first coupled magnetic leg 34, a second coupled magnetic leg 35 and a third coupled magnetic leg 36, which are separately and independently disposed. The first common magnetic leg 32 is located beside the first lateral side 31a. The second common magnetic leg 33 is located beside the second lateral side 31b. In addition, the second common magnetic leg 33 and the first common magnetic leg 32 are opposed to each other. The first coupled magnetic leg 34 is located beside the third lateral side 31c. In addition, the first coupled magnetic leg 34 is disposed between the first common magnetic leg 32 and the second common magnetic leg 33. The second coupled magnetic leg 35 is disposed between the first common magnetic leg 32 and the second common magnetic leg 33. In addition, the second coupled magnetic leg 35 is disposed between the first coupled magnetic leg 34 and the third coupled magnetic leg 36. The third coupled magnetic leg 36 is located beside the fourth lateral side 31d. In addition, the third coupled magnetic leg 36 is disposed between the first common magnetic leg 32 and the second common magnetic leg 33. The first coupled magnetic leg 34, the second coupled magnetic leg 35 and the third coupled magnetic leg 36 are discretely and sequentially disposed.

In the embodiment of FIGS. 2 and 3, the magnetic core assembly 3 is an EE-type magnetic core assembly. However, the concepts of the present disclosure are also applicable to an EI-type magnetic core assembly.

Please refer to FIGS. 2 and 3 again. The magnetic core assembly 3 further includes a first magnetic cover 37 and a second magnetic cover 38. The first magnetic cover 37 and the second magnetic cover 38 are opposed to each other. The first magnetic cover 37 includes an outer surface and an inner surface, which are opposed to each other. The outer surface of the first magnetic cover 37 is the fifth lateral side 31e of the magnetic core assembly 3. The second magnetic cover 38 includes an outer surface and an inner surface, which are opposed to each other. The outer surface of the second magnetic cover 38 is the sixth lateral side 31f of the magnetic core assembly 3. The first common magnetic leg 32, the second common magnetic leg 33, the first coupled magnetic leg 34, the second coupled magnetic leg 35 and the third coupled magnetic leg 36 are disposed between the inner surface of the first magnetic cover 37 and the inner surface of the second magnetic cover 38. The two ends of the first common magnetic leg 32 are connected with the inner surface of the first magnetic cover 37 and the inner surface of the second magnetic cover 38, respectively. The two ends of the second common magnetic leg 33 are connected with the inner surface of the first magnetic cover 37 and the inner surface of the second magnetic cover 38, respectively. The two ends of the first coupled magnetic leg 34 are connected with the inner surface of the first magnetic cover 37 and the inner surface of the second magnetic cover 38, respectively. The two ends of the second coupled magnetic leg 35 are connected with the inner surface of the first magnetic cover 37 and the inner surface of the second magnetic cover 38, respectively. The two ends of the third coupled magnetic leg 36 are connected with the inner surface of the first magnetic cover 37 and the inner surface of the second magnetic cover 38, respectively.

The winding assembly 4 includes a first winding 41 and a second winding 42. The first winding 41 and the second winding 42 are overlapped with each other.

For example, the first winding 41 is an electrical trace in a printed circuit board, a copper bar embedded in the printed circuit board, an individual copper bar or an individual copper sheet. The first winding 41 includes a first input part 411, a first intermediate part 412 and a first output part 413, which are connected with each other sequentially. The first input part 411 is disposed between the first common magnetic leg 32 and the first coupled magnetic leg 34. The first intermediate part 412 is disposed between the first coupled magnetic leg 34 and the second coupled magnetic leg 35, between the second common magnetic leg 33 and the second coupled magnetic leg 35, and between the second coupled magnetic leg 35 and the third coupled magnetic leg 36. The first output part 413 is disposed between the first common magnetic leg 32 and the third coupled magnetic leg 36. The first input part 411 is an input terminal of the first winding 41 for receiving an DC current. The first output part 413 is an output terminal of the first winding 41 for outputting the DC current.

Similarly, the second winding 42 is an electrical trace in a printed circuit board, a copper bar embedded in the printed circuit board, an individual copper bar or an individual copper sheet. The second winding 42 includes a second input part 421, a second intermediate part 422 and a second output part 423, which are connected with each other sequentially. The second input part 421 is disposed between the second common magnetic leg 33 and the first coupled magnetic leg 34. The second intermediate part 422 is disposed between the first coupled magnetic leg 34 and the second coupled magnetic leg 35, between the first common magnetic leg 32 and the second coupled magnetic leg 35, and between the second coupled magnetic leg 35 and the third coupled magnetic leg 36. The second output part 423 is disposed between the second common magnetic leg 33 and the third coupled magnetic leg 36. The second input part 421 is an input terminal of the second winding 42 for receiving an DC current. The second output part 423 is an output terminal of the second winding 41 for outputting the DC current.

Since the first intermediate part 412 of the first winding 41 and the second intermediate part 422 of the second winding 42 are disposed between the first coupled magnetic leg 34 and the second coupled magnetic leg 35, the first intermediate part 412 of the first winding 41 and the second intermediate part 422 of the second winding 42 are overlapped with each other in the region between the first coupled magnetic leg 34 and the second coupled magnetic leg 35. Similarly, since the intermediate part 412 of the first winding 41 and the second intermediate part 422 of the second winding 42 are disposed between the second coupled magnetic leg 35 and the third coupled magnetic leg 36, the intermediate part 412 of the first winding 41 and the second intermediate part 422 of the second winding 42 are overlapped with each other in the region between the second coupled magnetic leg 35 and the third coupled magnetic leg 36. Moreover, an insulation medium (not shown) is disposed between the first winding 41 and the second winding 42. Consequently, the overlap regions of the first winding 41 and the second winding 42 are isolated from each other through the insulation medium.

As mentioned above, the intermediate part 412 of the first winding 41 and the second intermediate part 422 of the second winding 42 are disposed between the first coupled magnetic leg 34 and the second coupled magnetic leg 35 and between the second coupled magnetic leg 35 and the third coupled magnetic leg 36. In other words, there are two overlap regions between the first winding 41 and the second winding 42. In comparison with the conventional magnetic device 1 with a single overlap region between the two windings, the magnetic device 2 of the present disclosure has more overlap regions between the first winding 41 and the second winding 42.

Due to the winding structures of the first winding 41 and the second winding 42, the other features are provided. For example, after 50% of the respective AC magnetic fluxes generated by the first winding 41 and the second winding 42 are cancelled out on the second coupled magnetic leg 35, the AC magnetic fluxes are uniformly divided into two parts, and these two parts of the AC magnetic fluxes pass the first coupled magnetic leg 34 and the third coupled magnetic leg 36 in a closed loop respectively. Consequently, the first coupled magnetic leg 34, the second coupled magnetic leg 35 and the third coupled magnetic leg 36 are referred as coupled magnetic legs. In addition, 50% of the respective AC magnetic fluxes generated by the first winding 41 and the second winding 42 are superimposed with each other on the first common magnetic leg 32 and the second common magnetic leg 33, and the superimposed AC magnetic fluxes pass through the first common magnetic leg 32 and the second common magnetic leg 33 in a closed loop. Consequently, the first common magnetic leg 32 and the second common magnetic leg 33 are referred as common magnetic legs. Moreover, the DC magnetic fluxes generated by the first winding 41 on the first coupled magnetic leg 34, the second coupled magnetic leg 35 and the third coupled magnetic leg 36 and the DC magnetic fluxes generated by the second winding 42 on the first coupled magnetic leg 34, the second coupled magnetic leg 35 and the third coupled magnetic leg 36 are cancelled out. Consequently, the DC magnetic fluxes generated by the first winding 41 on the first common magnetic leg 32 and the second common magnetic leg 33 and the DC magnetic fluxes generated by the second winding 42 on the first common magnetic leg 32 and the second common magnetic leg 33 are superimposed with each other.

In the magnetic device 2 of the present disclosure, the first coupled magnetic leg 34, the second coupled magnetic leg 35 and the third coupled magnetic leg 36 are matched with the first magnetic cover 37 to form an E-shaped structure, and the first coupled magnetic leg 34, the second coupled magnetic leg 35 and the third coupled magnetic leg 36 are matched with the second magnetic cover 38 to form an E-shaped structure. AC magnetic fluxes pass through the second coupled magnetic leg 35 and then pass through the first coupled magnetic leg 34 and the third coupled magnetic leg 36 in a closed loop. In the conventional magnetic device 1, the two middle legs 11 are matched with the top magnetic cover to form an U-shaped structure, and the two middle legs 11 are matched with the lower magnetic cover to form an U-shaped structure. AC magnetic fluxes pass through the two middle legs 11 in a closed loop. When compared with the conventional magnetic device 1, the thickness of the magnetic covers of the magnetic device 2 of the present disclosure are largely reduced. Consequently, the magnetic device is slim and has low thermal resistance.

Figure 4:
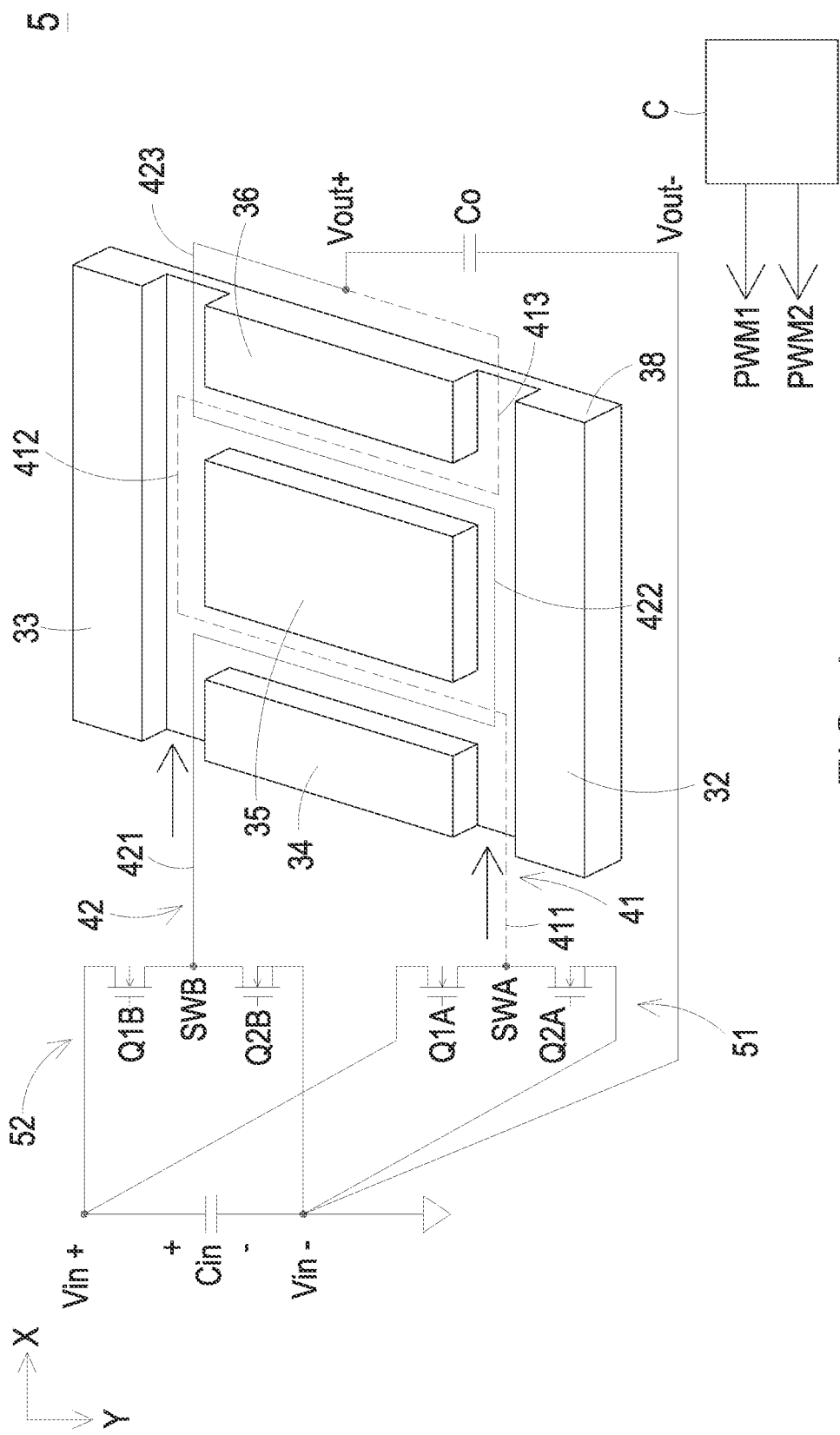
FIG. 4 schematically illustrates a power converter comprising the magnetic device as shown in FIG. 2.
Figure 5:
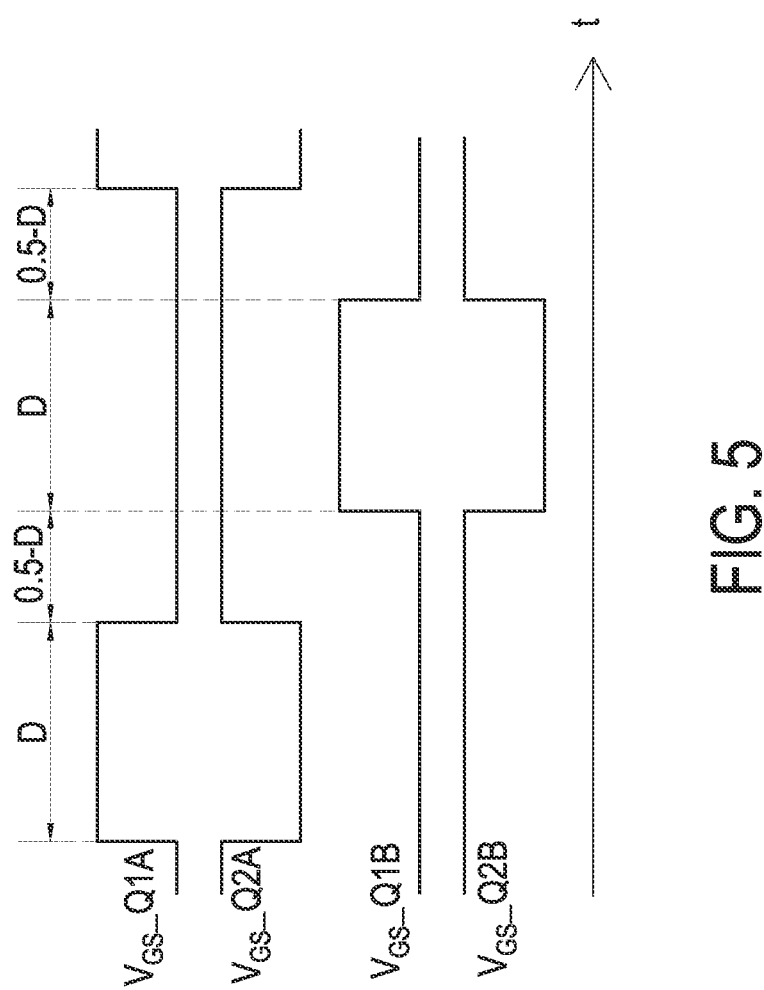
FIG. 5 is a schematic timing waveform diagram illustrating driving signals for controlling the switches of the half-bridge arms of the power converter.

Please refer to FIGS. 2, 3, 4 and 5. FIG. 4 schematically illustrates a power converter comprising the magnetic device as shown in FIG. 2. FIG. 5 is a schematic timing waveform diagram illustrating driving signals for controlling the switches of the half-bridge arms of the power converter. For succinctness, only the second magnetic cover 38 of the magnetic core assembly 3 is shown, the first magnetic cover 37 of the magnetic core assembly 3 is not shown. The magnetic device 2 as shown in FIGS. 2 and 3 can be applied to the power converter 5 as shown in FIG. 4. In this embodiment, the power converter 5 is a two-phase interleaved parallel-connected buck converter. In addition to the magnetic device 2, the power converter 5 further includes a first half-bridge arm 51, a second half-bridge arm 52, an input capacitor Cin, an output capacitor Co and a control circuit C. The magnetic device 2, the first half-bridge arm 51, the second half-bridge arm 52, the input capacitor Cin and the output capacitor Co are disposed along a horizontal direction. In other words, the power converter 5 is extended in the horizontal direction.

The first half-bridge arm 51 is located beside the third lateral side 31c of the magnetic device 3 (i.e., the side of the first coupled magnetic leg 34 away from the third coupled magnetic leg 36). In addition, the first half-bridge arm 51 includes two switches Q1A and Q2A. The two switches Q1A and Q2A are electrically connected with each other. The node SWA between the two switches Q1A and Q2A is connected with the first input part 411 of the first winding 41. Consequently, the first half-bridge arm 51 and the first winding 41 (i.e., a first inductor) are collaboratively formed as first phase buck circuit.

The second half-bridge arm 52 is also located beside the third lateral side 31c of the magnetic device 3 (i.e., the side of the first coupled magnetic leg 34 away from the third coupled magnetic leg 36). In addition, the second half-bridge arm 52 includes two switches Q1B and Q2B. The two switches Q1B and Q2B are electrically connected with each other. The node SWB between the two switches Q1B and Q2B is connected with the second input part 421 of the second winding 42. Consequently, the second half-bridge arm 52 and the second winding 42 (i.e., a second inductor) are collaboratively formed as second phase buck circuit.

The first terminal of the first half-bridge arm 51, the first terminal of the second half-bridge arm 52 and the first terminal of the input capacitor Cin are electrically connected with a positive input terminal Vin+ of the power converter 5. The second terminal of the first half-bridge arm 51, the second terminal of the second half-bridge arm 52 and the second terminal of the input capacitor Cin are electrically connected with a negative input terminal Vin− of the power converter 5. The first terminal of the output capacitor Co, the first output part 413 of the first winding 41 and the second output part 423 of the second winding 42 are electrically connected with a positive output terminal Vout+ of the power converter 5. The node between the first output part 413 of the first winding 41 and the second output part 423 of the second winding 42 is located beside the fourth lateral side 31d of the magnetic device 3 (i.e., the side of the third coupled magnetic leg 36 away from the first coupled magnetic leg 34). The second terminal of the output capacitor Co is connected with a negative output terminal Vout− of the power converter 5. Moreover, the negative input terminal Vin− and the negative output terminal Vout− of the power converter 5 are connected with each other.

A first AC voltage is applied to the first winding 41 between the first input part 411 and the first output part 413. A second AC voltage is applied to the second winding 42 between the second input part 421 and the second output part 423. In this embodiment, the power converter 5 is extended in the horizontal direction. The first half-bridge arm 51 and the second half-bridge arm 52 are disposed on the left of the first coupled magnetic leg 34. The positive output terminal Vout+ and the output capacitor Co are disposed on the right of the third coupled magnetic leg 36. In this way, the distances from the midpoints (i.e., nodes) SWA and SWB of the two bridge arms to the positive output terminal Vout+ are the shortest, and the parasitic resistance of the winding assembly 4 of the magnetic device 2 is the smallest. Since the parasitic resistance of the first winding 41 and the parasitic resistance of the second winding 42 are the smallest, the conduction loss of the winding assembly 4 is the lowest.

The control circuit C is electrically connected with a driving circuit (not shown) that is used for driving the four switches Q1A, Q2A, Q1B and Q2B. The control circuit C generates two PWM switching signals PWM1 and PWM2. The driving circuit drives the switches Q1A and Q2A according to the PWM switching signal PWM1. The driving circuit drives the switches Q1B and Q2B according to the PWM switching signal PWM2. The timing waveforms of the driving signals for driving the four switches Q1A, Q2A, Q1B and Q2B are shown in FIG. 5. The driving signals VGS_Q1A and VGS_Q2A for driving the two switches Q1A and Q2A of the first half-bridge arm 51 are complementary to each other. The duty cycle is indicated as D. The driving signals VGS_Q1B and VGS_Q2B for driving the two switches Q1B and Q2B of the second half-bridge arm 52 are complementary to each other. The duty cycle is indicated as D. The phase difference between the driving signal VGS_Q1A and the driving signal VGS_Q1B is in the range between 150 and 210 degrees, e.g., 180 degrees. The phase difference between the driving signal VGS_Q2A and the driving signal VGS_Q2B is in the range between 150 and 210 degrees, e.g., 180 degrees. Consequently, the phase difference between the first AC voltage applied to the first winding 41 and the second AC voltage applied to the second winding 42 is in the range between 150 and 210 degrees, e.g., 180 degrees. As mentioned above, the AC magnetic fluxes generated by the first winding 41 and the second winding 42 are cancelled out on the first coupled magnetic leg 34, the second coupled magnetic leg 35 and the third coupled magnetic leg 36. In case that the phase difference between the first AC voltage and the second AC voltage is 180 degrees, the frequency of the AC magnetic flux flowing through each of the first coupled magnetic leg 34, the second coupled magnetic leg 35 and the third coupled magnetic leg 36 is nearly equal to the frequency of the PWM switching signal PWM1 or the PWM switching signal PWM2. Moreover, the AC magnetic fluxes generated by the first winding 41 and the second winding 42 are superimposed with each other on the first common magnetic leg 32 and the second common magnetic leg 33. Consequently, the frequency of each of the AC magnetic fluxes on the first common magnetic leg 32 and the second common magnetic leg 33 is twice the frequency of the PWM switching signal PWM1 or the PWM switching signal PWM2. In addition, the AC magnetic flux on the second coupled magnetic leg 35 is greater than the AC magnetic flux on the first common magnetic leg 32 or the second common magnetic leg 33.

The two switches Q1A and Q2A of the first half-bridge arm 51 and the two switches Q1B and Q2B of the second half-bridge arm 52 are controlled according to the above control method. Consequently, the DC current on the first winding 41 of the winding assembly 4 flows through the first input part 411, the first intermediate part 412 and the first output part 413 sequentially and passes through the magnetic core assembly 3 all at once. Similarly, the DC current on the second winding 42 of the winding assembly 4 flows through the second input part 421, the second intermediate part 422 and the second output part 423 sequentially and passes through the magnetic core assembly 3 all at once.

The DC magnetic fluxes generated on the first coupled magnetic leg 34, the second coupled magnetic leg 35 and the third coupled magnetic leg 36 by the first winding 41 and the DC magnetic fluxes generated on the first coupled magnetic leg 34, the second coupled magnetic leg 35 and the third coupled magnetic leg 36 by the second winding 42 are cancelled out. Under control of a current-sharing circuit (not shown), the DC current flowing through the first winding 41 and the DC current flowing through the second winding 42 are equal. Consequently, the DC magnetic fluxes on the first coupled magnetic leg 34, the second coupled magnetic leg 35 and the second coupled magnetic leg 36 are nearly zero. In an embodiment, the first coupled magnetic leg 34, the second coupled magnetic leg 35 and the third coupled magnetic leg 36 have air gaps. Moreover, the first coupled magnetic leg 34, the second coupled magnetic leg 35 and the third coupled magnetic leg 36 are made of ferrite or high-permeability iron powder.

The DC magnetic fluxes generated on the first common magnetic leg 32, the second common magnetic leg 33 by the first winding 41 and the DC magnetic fluxes generated on the first common magnetic leg 32, the second common magnetic leg 33 by the second winding 42 are superimposed with each other. In an embodiment, the first common magnetic leg 32 and the second common magnetic leg 33 have air gaps. Moreover, the first common magnetic leg 32 and the second common magnetic leg 33 are made of ferrite or low-permeability iron powder in order to avoid magnetic saturation of the first common magnetic leg 32 and the second common magnetic leg 33. For example, the air gap of the first common magnetic leg 32 is disposed between the first common magnetic leg 32 and the first magnetic cover 37, and/or the air gap of the first common magnetic leg 32 is disposed between the first common magnetic leg 32 and the second magnetic cover 38, and/or the air gap of the first common magnetic leg 32 is disposed in a middle region of the first common magnetic leg 32. Similarly, the air gap of the second common magnetic leg 33 is disposed between the second common magnetic leg 33 and the first magnetic cover 37, and/or the air gap of the second common magnetic leg 33 is disposed between the second common magnetic leg 33 and the second magnetic cover 38, and/or the air gap of the second common magnetic leg 33 is disposed in the middle region of the second common magnetic leg 33.

In another embodiment, the DC current flowing through the first winding 41 and DC current flowing through the second winding 42 are not equal. In other words, the DC magnetic fluxes generated on the first coupled magnetic leg 34, the second coupled magnetic leg 35 and the third coupled magnetic leg 36 are not equal. Under this circumstance, the first coupled magnetic leg 34, the second coupled magnetic leg 35 and the third coupled magnetic leg 36 need to have air gaps to avoid magnetic saturation on the first coupled magnetic leg 34, the second coupled magnetic leg 35 and the third coupled magnetic leg 36. Preferably but not exclusively, the length of the air gap of each of the first common magnetic leg 32 and the second common magnetic leg 33 is longer than the length of the air gap of each of the first coupled magnetic leg 34, the second coupled magnetic leg 35 and the third coupled magnetic leg 36.

In an embodiment, the air gap of the first coupled magnetic leg 34 is disposed between the first coupled magnetic leg 34 and the first magnetic cover 37, and/or the air gap of the first coupled magnetic leg 34 is disposed between the first coupled magnetic leg 34 and the second magnetic cover 38, and/or the air gap of the first coupled magnetic leg 34 is disposed in a middle region of the first coupled magnetic leg 34. The air gap of the second coupled magnetic leg 35 is disposed between the second coupled magnetic leg 35 and the first magnetic cover 37, and/or the air gap of the second coupled magnetic leg 35 is disposed between the second coupled magnetic leg 35 and the second magnetic cover 38, and/or air gap of the second coupled magnetic leg 35 is disposed in a middle region of the second coupled magnetic leg 35. The air gap of the third coupled magnetic leg 36 is disposed between the third coupled magnetic leg 36 and the first magnetic cover 37, and/or the air gap of the third coupled magnetic leg 36 is disposed between the third coupled magnetic leg 36 and the second magnetic cover 38, and/or air gap of the third coupled magnetic leg 36 is disposed in the middle region of the third coupled magnetic leg 36.

In an embodiment, the magnetic resistance of each of the first common magnetic leg 32 and the second common magnetic leg 33 is greater than three times the magnetic resistance of the first coupled magnetic leg 34, three times the magnetic resistance of the second coupled magnetic leg 35 or three times the magnetic resistance of the third coupled magnetic leg 36. In another embodiment, the magnetic resistance of each of the first common magnetic leg 32 and the second common magnetic leg 33 is greater than five times the magnetic resistance of the first coupled magnetic leg 34, five times the magnetic resistance of the second coupled magnetic leg 35 or five times the magnetic resistance of the third coupled magnetic leg 36.

As mentioned above, the AC magnetic flux of the second coupled magnetic leg 35 is larger, but the air gap and the magnetic resistance are smaller. The air gap and the magnetic resistance of the second common magnetic leg 33 are larger, but the AC magnetic flux is smaller. Consequently, the AC current ripple of the first winding 41 between the first common magnetic leg 32 and the first coupled magnetic leg 34 is smaller. Similarly, the AC magnetic flux of the second coupled magnetic leg 35 is larger, but the air gap and the magnetic resistance are smaller. The air gap and the magnetic resistance of the first common magnetic leg 32 are larger, but the AC magnetic flux is smaller. Consequently, the AC current ripple of the second winding 42 between the second common magnetic leg 33 and the first coupled magnetic leg 34 is smaller.

For reducing the AC current ripple of the first winding 41 and the AC current ripple of the second winding 42, the AC magnetic flux passes through the first coupled magnetic leg 34, the third coupled magnetic leg 36 and the first magnetic cover 37 (or the second magnetic cover 38) in a closed loop. In an embodiment, the regions of the first magnetic cover 37 and the second magnetic cover 38 corresponding to the closed loop are made of ferrite or high-permeability iron powder.

For optimizing the performance of the magnetic device 2, increasing the equivalent inductance of each winding of the magnetic device 2 and reducing the core loss of the magnetic core assembly 3, the material of the first coupled magnetic leg 34, the second coupled magnetic leg 35 and the third coupled magnetic leg 36 is different from a material of the first common magnetic leg 32 and the second magnetic leg 33. For example, each of the first coupled magnetic leg 34, the second coupled magnetic leg 35 and the third coupled magnetic leg 36 is made of ferrite with no air gap or a small air gap, high-permeability iron powder, or any other low core loss material. Consequently, the core loss of the first coupled magnetic leg 34, the second coupled magnetic leg 35 and the third coupled magnetic leg 36 will be reduced. Moreover, each of the first common magnetic leg 32 and the second magnetic leg 33 is made of ferrite with a large air gap or low-permeability iron powder with a distributed air gap. Consequently, the magnetic saturation and the magnetic density of the first common magnetic leg 32 and the second magnetic leg 33 are largely increased.

Please refer to FIGS. 2 and 3. The line passing through a center of the first lateral side 31a and a center of the second lateral side 31b of the magnetic core assembly 3 is referred as a symmetric line P. Each of the first common magnetic leg 32 and the second magnetic leg 33 is in mirror symmetry with respect to the symmetric line P. The first winding 41 is in mirror symmetry with respect to the symmetric line P. The second winding 42 is in mirror symmetry with respect to the symmetric line P. The second coupled magnetic leg 35 is in mirror symmetry with respect to the symmetric line P. The first coupled magnetic leg 34 and the third coupled magnetic leg 36 are symmetric to each other with respect to the symmetric line P. Due to this structural design, the AC magnetic densities of the first coupled magnetic leg 34, the second coupled magnetic leg 35 and the third coupled magnetic leg 36 are nearly equal. Consequently, the core loss densities are nearly equal, and the core loss is the lowest. Moreover, the first common magnetic leg 32 and the second common magnetic leg 33 are symmetric to each other with respect to the second coupled magnetic leg 35, and the first winding 41 and the second winding 42 are symmetric to each other with respect to the second coupled magnetic leg 35. Consequently, the DC magnetic flux densities of the first common magnetic leg 32 and the second magnetic leg 33 are nearly equal. Consequently, the capability of withstanding the magnetic saturation will be enhanced.

In an embodiment, the first half-bridge arm 51, the second half-bridge arm 52, the first winding 41 and the second winding 42 of the power converter 5 are disposed along a horizontal direction. Consequently, the power converter 5 is extended in the horizontal direction. In an embodiment, the first half-bridge arm 51, the second half-bridge arm 52, the first winding 41 and the second winding 42 are integrated into a printed circuit board, a plastic molding structure or any other appropriate package structure. In an embodiment, the longitudinal projection of the first half-bridge arm 51 along the X direction on a second virtual surface partially overlaps with the longitudinal projection of the first winding 41 along the X direction on the second virtual surface, and the longitudinal projection of the first half-bridge arm 51 along the X direction on the second virtual surface partially overlaps with the longitudinal projection of the second winding 42 along the X direction on the second virtual surface. The longitudinal projection of the second half-bridge arm 52 along the X direction on the second virtual surface partially overlaps with the longitudinal projection of the first winding 41 along the X direction on the second virtual surface, and the longitudinal projection of the second half-bridge arm 52 along the X direction on the second virtual surface partially overlaps with the longitudinal projection of the second winding 42 along the X direction on the second virtual surface. That is, the first half-bridge arm 51 is aligned with a part of the first winding 41 and a part of the second winding 42 in the horizontal direction, and the second half-bridge arm 52 is aligned with another part of the first winding 41 and another part of the second winding 42 in the horizontal direction.

Figure 6:
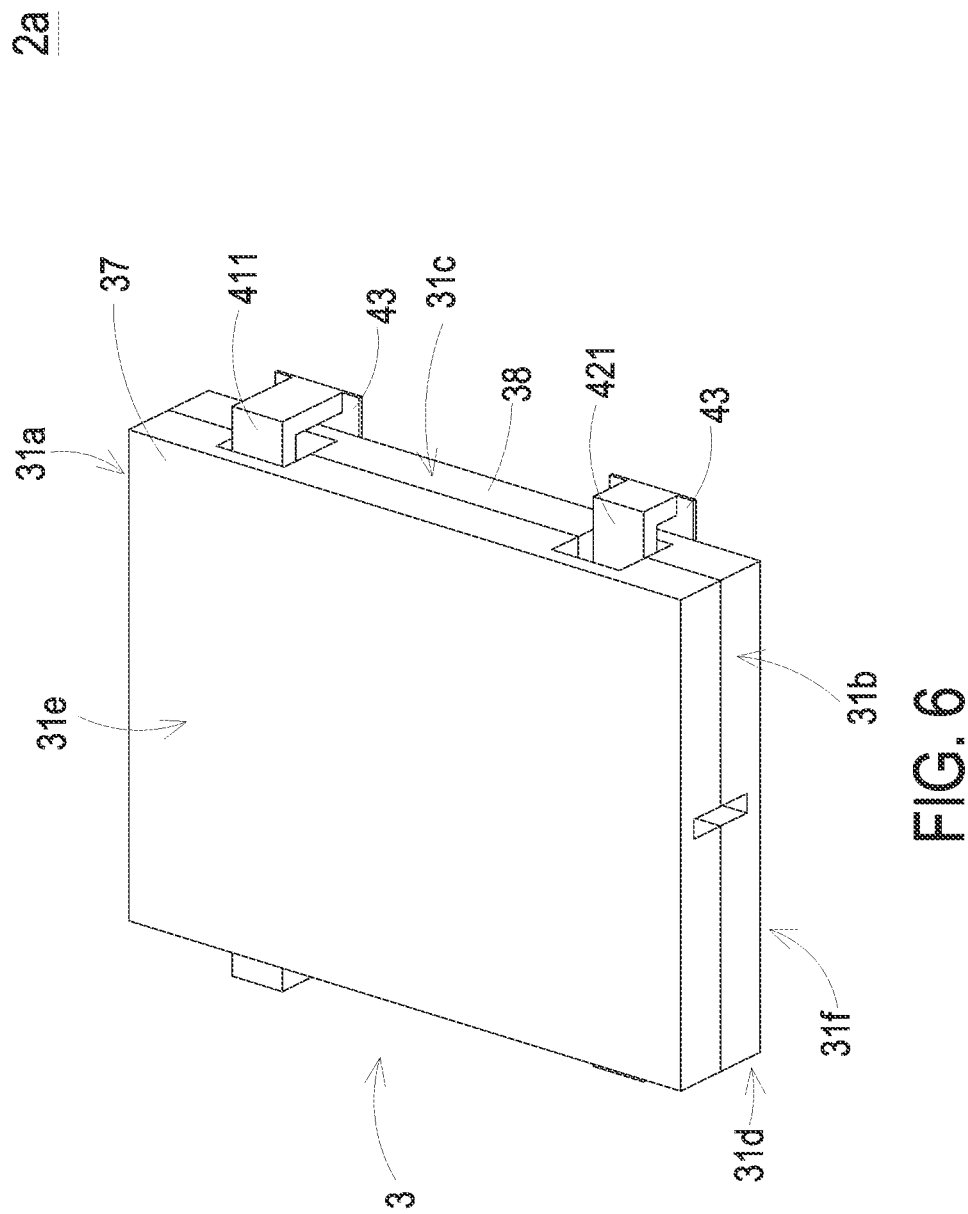
FIG. 6 is a schematic perspective view illustrating the structure of a magnetic device according to a second embodiment of the present disclosure.
Figure 7:
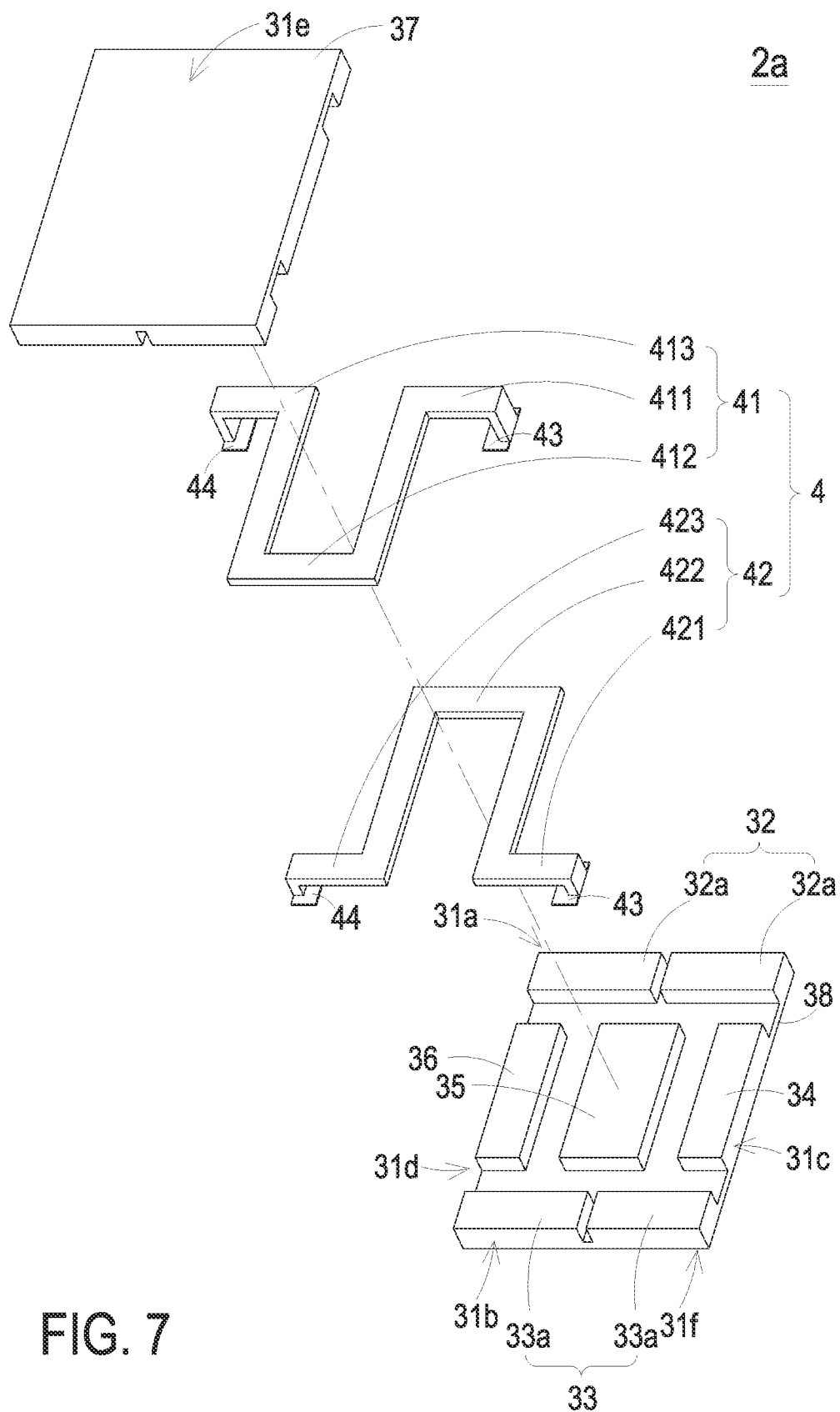
FIG. 7 is a schematic exploded view illustrating the magnetic device as shown in FIG. 6.

In some embodiments, the magnetic device 2 is an individual surface mount device. FIG. 6 is a schematic perspective view illustrating the structure of a magnetic device according to a second embodiment of the present disclosure. FIG. 7 is a schematic exploded view illustrating the magnetic device as shown in FIG. 6. In comparison with the magnetic device 2 of the first embodiment, the magnetic device 2a of this embodiment further includes two input conduction parts 43 and two output conduction parts 44. The magnetic device 2a is electrically connected with a system board (not shown) through the two input conduction parts 43 and the two output conduction parts 44. The two input conduction parts 43 are respectively used as the nodes SWA and SWB as shown in FIG. 4.

The two input conduction parts 43 are disposed on the sixth lateral side 31f of the magnetic core assembly 3. That is, the two input conduction parts 43 are disposed on the surface of the second magnetic cover 38 (or embedded in the surface of the second magnetic cover 38). The first input part 411 of the first winding 41 is bent toward the second magnetic cover 38 and connected with one of the two input conduction parts 43. The second input part 421 of the second winding 42 is bent toward the second magnetic cover 38 and connected with the other of the two input conduction parts 43. The two output conduction parts 44 are electrically connected with the positive output terminal Vout+ as shown in FIG. 4. The two output conduction parts 44 are also disposed on the sixth lateral side 31f of the magnetic core assembly 3. That is, the two output conduction parts 44 are disposed on the surface of the second magnetic cover 38 (or embedded in the surface of the second magnetic cover 38). The first output part 413 of the first winding 41 is bent toward the second magnetic cover 38 and connected with one of the two output conduction parts 44. The second output part 423 of the second winding 42 is bent toward the second magnetic cover 38 and connected with the other of the two output conduction parts 44.

In an embodiment, in order to improve the yield of the magnetic device 2a, the first common magnetic leg 32 includes a plurality of first sub-legs 32a (e.g., two first sub-legs 32a), and the second common magnetic leg 33 includes a plurality of second sub-legs 33a (e.g., two second sub-legs 33a). The plurality of first sub-legs 32a are discretely disposed between the third lateral side 31c and the fourth lateral side 31d of the magnetic core assembly 3. The plurality of second sub-legs 33a are discretely disposed between the third lateral side 31c and the fourth lateral side 31d of the magnetic core assembly 3. Certainly, the first common magnetic leg 32 can be divided into more first sub-legs 32a, and the lengths of the plurality of first sub-legs 32a may be identical or different. The second common magnetic leg 33 can be divided into more second sub-legs 33a, and the lengths of the plurality of second sub-legs 33a may be identical or different.

It is noted that the installation positions of the input conduction parts 43 and the output conduction parts 44 are not restricted. In another embodiment, the two input conduction parts 43 are disposed on the fifth lateral side 31e of the magnetic core assembly 3, and the two output conduction parts 44 are disposed on the sixth lateral side 31f of the magnetic core assembly 3. Consequently, the magnetic device 2a, the first half-bridge arm 51 and the second half-bridge arm 52 of the power converter are disposed along a vertical direction. Generally, the first half-bridge arm 51 and the second half-bridge arm 52 are disposed on the top surface of the magnetic device 2a. The first half-bridge arm 51 and the second half-bridge arm 52 are the heat generation components of the power converter. Since the first half-bridge arm 51 and the second half-bridge arm 52 (i.e., the hotspots) are disposed on the top side of the power converter, the heat resistance is largely reduced. Moreover, it is easy to install a heat conduction component (e.g., a heat sink or a heat dissipation plate) on the top side of the power converter to facilitate the heat dissipation. Consequently, the heat dissipation efficiency is enhanced.

In an embodiment, the first half-bridge arm 51, the second half-bridge arm 52, the first winding 41 and the second winding 42 of the power converter 5 are disposed along the vertical direction. Consequently, the power converter 5 is extended in the vertical direction. In an embodiment, the first half-bridge arm 51, the second half-bridge arm 52, the first winding 41 and the second winding 42 are integrated into a printed circuit board, a plastic molding structure or any other appropriate package structure. In an embodiment, the horizontal projection of the first half-bridge arm 51 along the Y direction on a first virtual surface partially overlaps with the horizontal projection of the first winding 41 along the Y direction on the first virtual surface, and the horizontal projection of the first half-bridge arm 51 along the Y direction on the first virtual surface partially overlaps with the horizontal projection of the second winding 42 along the Y direction on the first virtual surface. The horizontal projection of the second half-bridge arm 52 along the Y direction on the first virtual surface partially overlaps with the horizontal projection of the first winding 41 along the Y direction on the first virtual surface, and the horizontal projection of the second half-bridge arm 52 along the Y direction on the first virtual surface partially overlaps with the horizontal projection of the second winding 42 along the Y direction on the first virtual surface. That is, the first half-bridge arm 51 is aligned with a part of the first winding 41 and a part of the second winding 42 in the vertical direction, and the second half-bridge arm 52 is aligned with another part of the first winding 41 and another part of the second winding 42 in the vertical direction.

Figure 8A:
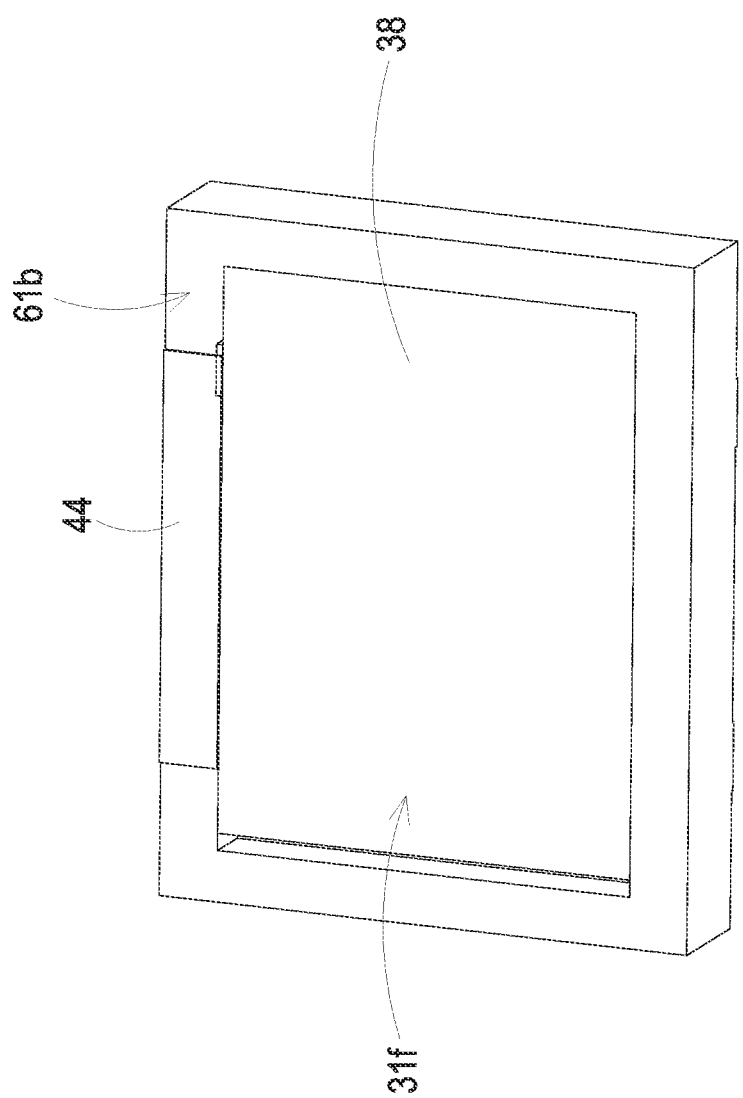
FIG. 8A is a schematic perspective view illustrating the structure of a magnetic device according to a third embodiment of the present disclosure.
Figure 8B:
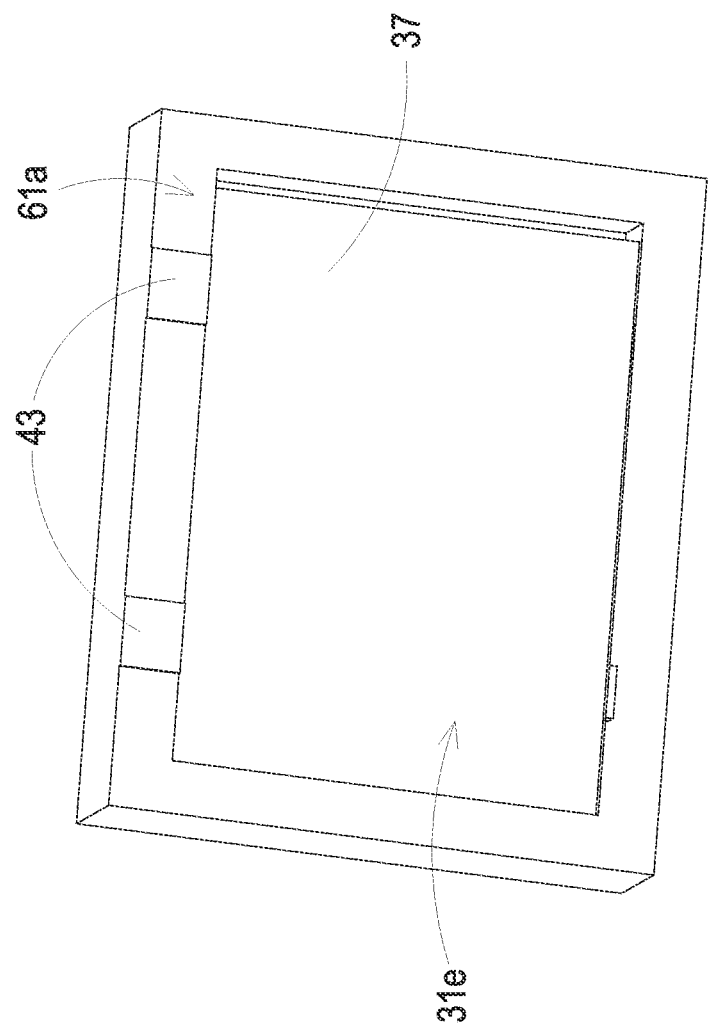
FIG. 8B is a schematic assembled view illustrating the magnetic device as shown in FIG. 8A and taken along another viewpoint.
Figure 9:
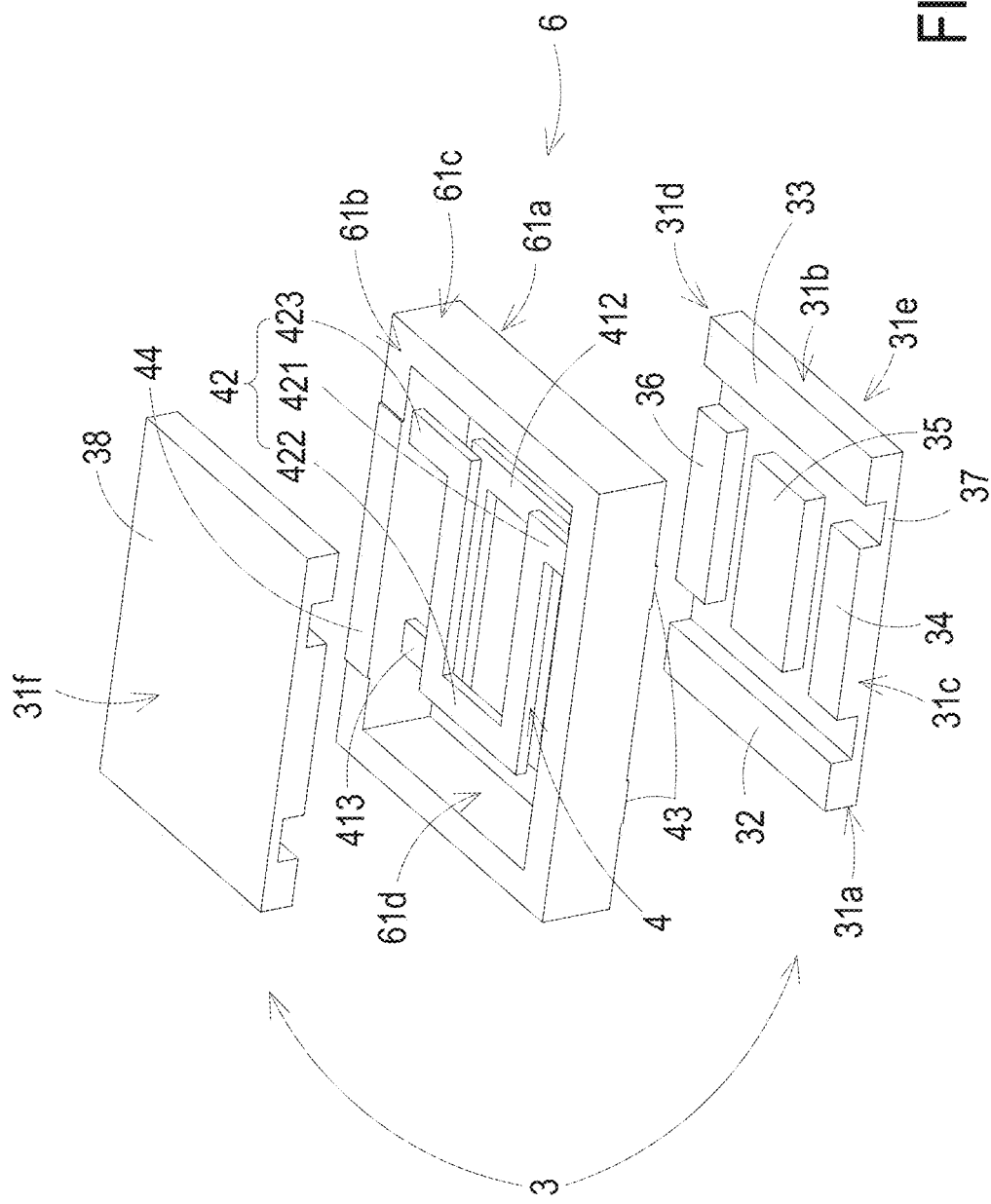
FIG. 9 is a schematic exploded view illustrating the magnetic device as shown in FIG. 8A.

Please refer to FIGS. 4, 8A, 8B and 9. FIG. 8A is a schematic perspective view illustrating the structure of a magnetic device according to a third embodiment of the present disclosure. FIG. 8B is a schematic assembled view illustrating the magnetic device as shown in FIG. 8A and taken along another viewpoint. FIG. 9 is a schematic exploded view illustrating the magnetic device as shown in FIG. 8A. In comparison with the magnetic device 2 of the first embodiment as shown in FIGS. 2 and 3, the magnetic device 2b of this embodiment includes a main body 6. The main body 6 is a printed circuit board or a combination of copper bars and a plastic molding structure. The main body 6 has a first surface 61a, a second surface 61b, a plurality of lateral walls 61c, an accommodation space 61d and a conductive structure. The first surface 61a and the second surface 61b are opposed to each other. The plurality of lateral walls 61c are disposed between the first surface 61a and the second surface 61b. In addition, the plurality of lateral walls 61c are disposed around magnetic core assembly 3 and the winding assembly 4. The accommodation space 61d is defined by the first surface 61a, the second surface 61b and the plurality of lateral walls 61c collaboratively. The magnetic core assembly 3 and the winding assembly 4 are accommodated within the accommodation space 61d. The first common magnetic leg 32, the second common magnetic leg 33, the first coupled magnetic leg 34, the second coupled magnetic leg 35, the third coupled magnetic leg 36, the first winding 41 and the second winding 42 are all disposed in the main body 6, and disposed between the plurality of lateral walls 61c. The shape of the accommodation space 61d matches the shape of the magnetic core assembly 3.

In this embodiment, the first surface 61a of the main body 6 is located beside the first magnetic cover 37, and the second surface 61b of the main body 6 is located beside the second magnetic cover 38. The distance between the first surface 61a and the second surface 61b of the main body 6 is greater than the distance between the outer surface of the first magnetic cover 37 (i.e., the fifth lateral side 31e of the magnetic core assembly 3) and the outer surface of the second magnetic cover 38 (i.e., the sixth lateral side 31f of the magnetic core assembly 3). Consequently, the magnetic core assembly 4 is completely enclosed by the main body 6. In this way, the magnetic device 2b can be electrically connected with a system board (not shown) more easily. In an embodiment, the electrical traces (not shown) in the main body 6 are formed as the conductive structure. The conductive structure is electrically connected with the first input part 411 and the first output part 413 of the first winding 41 and the second input part 421 and the second output part 423 of the second winding 42.

For reducing the DC impedance between the windings 41, 42 and the positive output terminal Vout+ of the power converter 5 and reducing the DC impedance asymmetry, it is preferred that the first output part 413 of the first winding 41 and the second output part 423 of the second winding 42 are connected with the positive output terminal Vout+ of the power converter 5 (see FIG. 4).

In this embodiment, the magnetic device 2b further includes two input conduction parts 43 and one output conduction part 44. The magnetic device 2b is electrically connected with the system board (not shown) through the two input conduction parts 43 and the output conduction part 44. The two input conduction parts 43 are respectively formed as the node SWA and the node SWB as shown in FIG. 4. The two input conduction parts 43 are disposed on the first surface 61a of the main body 6 (or embedded in the first surface 61a of the main body 6). The two input conduction parts 43 are electrically connected with the first input part 411 of the first winding 41 and the second input part 421 of the second winding 42 through the conductive structure of the main body 6, respectively. The outer conduction part 44 is electrically connected with the positive output terminal Vout+. The output conduction part 44 is disposed on the second surface 61b of the main body 6 (or embedded in the second surface 61b of the main body 6). The outer conduction part 44 is electrically connected with the first output part 413 of the first winding 41 and the second output part 423 of the second winding 42 through the conductive structure of the main body 6. It is noted that the installation positions of the two input conduction parts 43 and the output conduction part 44 are not restricted. For example, the two input conduction parts 43 and the output conduction part 44 may be disposed on the first surface 61a, second surface 61b or the plurality of lateral sides 61c of the main body 6 according to the practical requirements. In some embodiments, the conductive structure, the first winding 41, the second winding 42, the input conduction parts 43 and the output conduction part 44 are integrated as a one-piece structure. In an embodiment, a plurality of conductors are formed on the plurality of lateral sides 61c of the main body 6 to transfer control signals, feedback signals and power signals.

In case that the duty cycle of the two-phase interleaved parallel-connected buck converter is large, the AC magnetic flux passing through the second coupled magnetic leg 35 is much greater than the AC magnetic flux passing through the first common magnetic leg 32 or the second common magnetic leg 33. For reducing core loss of the magnetic core assembly 3, the cross-sectional areas of the associated magnetic legs are specially designed. For example, the total cross-sectional area of the first common magnetic leg 32 and the second common magnetic leg 33 is equal to or smaller than the total cross-sectional area of the first coupled magnetic leg 34, the second coupled magnetic leg 35 and the third coupled magnetic leg 36.

In case that the duty cycle of the two-phase interleaved parallel-connected buck converter is small, the AC magnetic flux passing through the second coupled magnetic leg 35 is slightly greater than the AC magnetic flux passing through the first common magnetic leg 32 or the second common magnetic leg 33. For reducing the ripple currents of the first winding 41 and the second winding 42 and increasing the capability of the first common magnetic leg 32 or the second common magnetic leg 33 to withstand the current saturation, the cross-sectional areas of the associated magnetic legs are specially designed. For example, the total cross-sectional area of the first common magnetic leg 32 and the second common magnetic leg 33 is greater than the total cross-sectional area of the first coupled magnetic leg 34, the second coupled magnetic leg 35 and the third coupled magnetic leg 36.

It is noted that the cross-sectional areas of the associated magnetic legs are not restricted. For example, in an embodiment, the cross-sectional area of the first common magnetic leg 32 is equal to 75% to 125% of the cross-sectional area of the second common magnetic leg 33, and preferably the cross-sectional area of the first common magnetic leg 32 is equal to the cross-sectional area of the second common magnetic leg 33. The cross-sectional area of the first coupled magnetic leg 34 is equal to 75% to 125% of the cross-sectional area of the third coupled magnetic leg 36, and preferably the cross-sectional area of the first coupled magnetic leg 34 is equal to the cross-sectional area of the third coupled magnetic leg 36. The cross-sectional area of the second coupled magnetic leg 35 is equal to 75% to 125% of the total cross-sectional area of the first coupled magnetic leg 34 and the third coupled magnetic leg 36, and preferably the cross-sectional area of the second coupled magnetic leg 35 is equal to the total cross-sectional area of the first coupled magnetic leg 34 and the third coupled magnetic leg 36.

In case that the interleaved parallel-connected buck converter is applied to the occasions where the amplitude of the output voltage is high and the duty cycle is large, the volt-second product withstood by each winding increases. Under this circumstance, the number of the coupled magnetic legs of the magnetic device may be further increased. Consequently, the core loss of the magnetic device is reduced.

Figure 10:
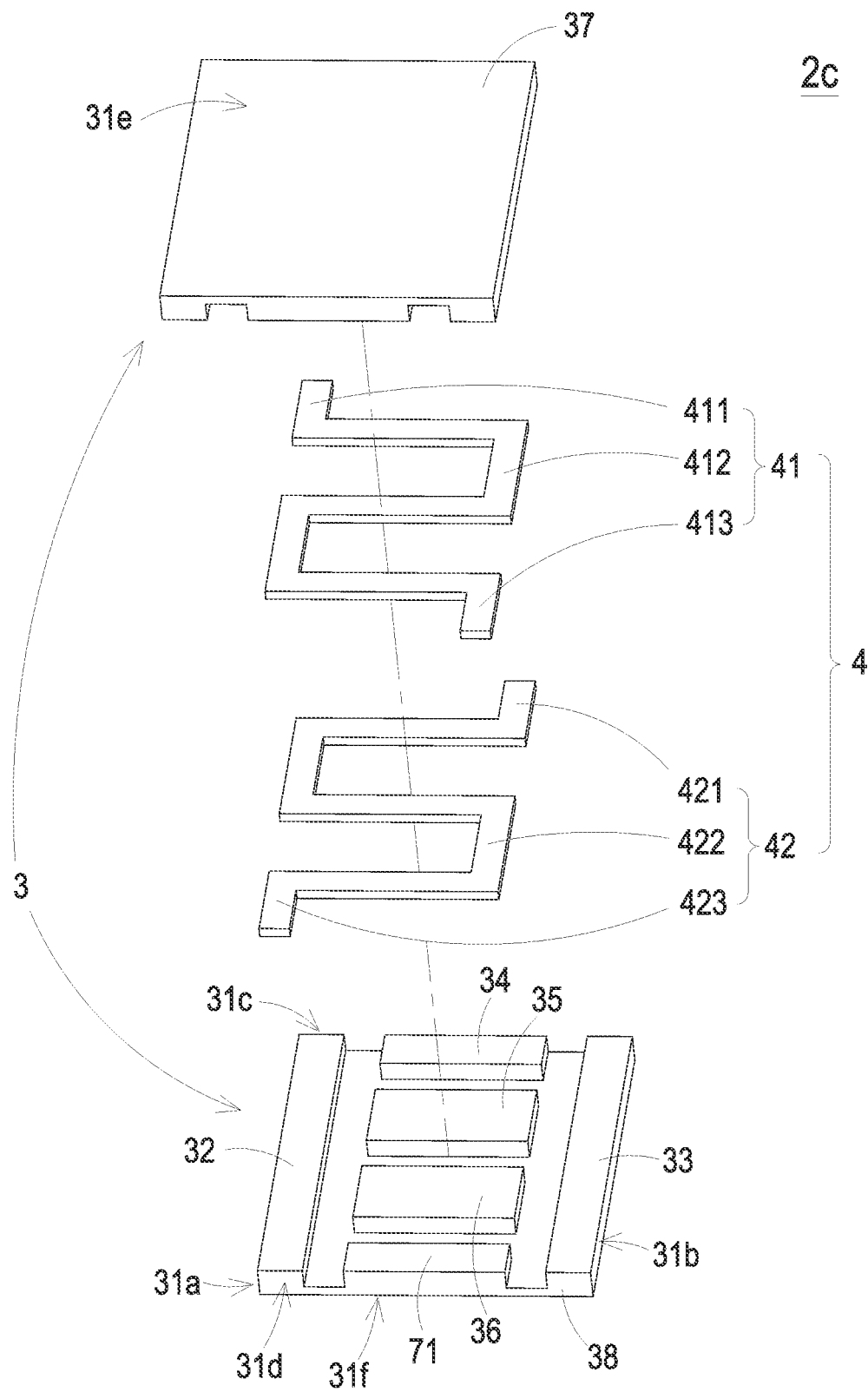
FIG. 10 is a schematic exploded view illustrating a magnetic device according to a fourth embodiment of the present disclosure.

FIG. 10 is a schematic exploded view illustrating a magnetic device according to a fourth embodiment of the present disclosure. In comparison with the magnetic device 2 of the first embodiment including the first coupled magnetic leg 34, the second coupled magnetic leg 35 and the third coupled magnetic leg 36, the magnetic device 2c of this embodiment further includes a fourth coupled magnetic leg 71. The first coupled magnetic leg 34 is located beside the third lateral side 31c. The fourth coupled magnetic leg 71 is located beside the fourth lateral side 31d. The first coupled magnetic leg 34, the second coupled magnetic leg 35, the third coupled magnetic leg 36 and the fourth coupled magnetic leg 71 are discretely and sequentially disposed. In addition, the first coupled magnetic leg 34, the second coupled magnetic leg 35, the third coupled magnetic leg 36 and the fourth coupled magnetic leg 71 are disposed between the first common magnetic leg 32 and the second magnetic leg 33. The cross-sectional area of the first coupled magnetic leg 34 is smaller than the cross-sectional area of the second coupled magnetic leg 35. The first coupled magnetic leg 34 and the second coupled magnetic leg 35 are respectively symmetric to the third coupled magnetic leg 36 and the fourth coupled magnetic leg 71 with respect to the symmetric line P (see FIG. 3).

The first input part 411 of the first winding 41 is disposed between the first common magnetic leg 32 and the first coupled magnetic leg 34. The first intermediate part 412 of the first winding 41 is disposed between the first coupled magnetic leg 34 and the second coupled magnetic leg 35, between the second common magnetic leg 33 and the second coupled magnetic leg 35, between the second coupled magnetic leg 35 and the third coupled magnetic leg 36, between the third coupled magnetic leg 36 and the first common magnetic leg 32, and between the third coupled magnetic leg 36 and the fourth coupled magnetic leg 71. The first output part 413 of the first winding 41 is disposed between the second common magnetic leg 33 and the fourth coupled magnetic leg 71. The second input part 421 of the second winding 42 is disposed between the second common magnetic leg 33 and the first coupled magnetic leg 34. The second intermediate part 422 of the second winding 42 is disposed between the first coupled magnetic leg 34 and the second coupled magnetic leg 35, between the first common magnetic leg 32 and the second coupled magnetic leg 35, between the second coupled magnetic leg 35 and the third coupled magnetic leg 36, between the third coupled magnetic leg 36 and the second common magnetic leg 33, and between the third coupled magnetic leg 36 and the fourth coupled magnetic leg 71. The second output part 423 of the second winding 42 is disposed between the first common magnetic leg 32 and the fourth coupled magnetic leg 71. In this embodiment, there are three overlap regions between the first winding and the second winding. In case that the thickness of the magnetic cover is fixed, the increase of the cross-sectional area of the coupled magnetic leg can reduce the core loss of the coupled magnetic leg.

Figure 11:
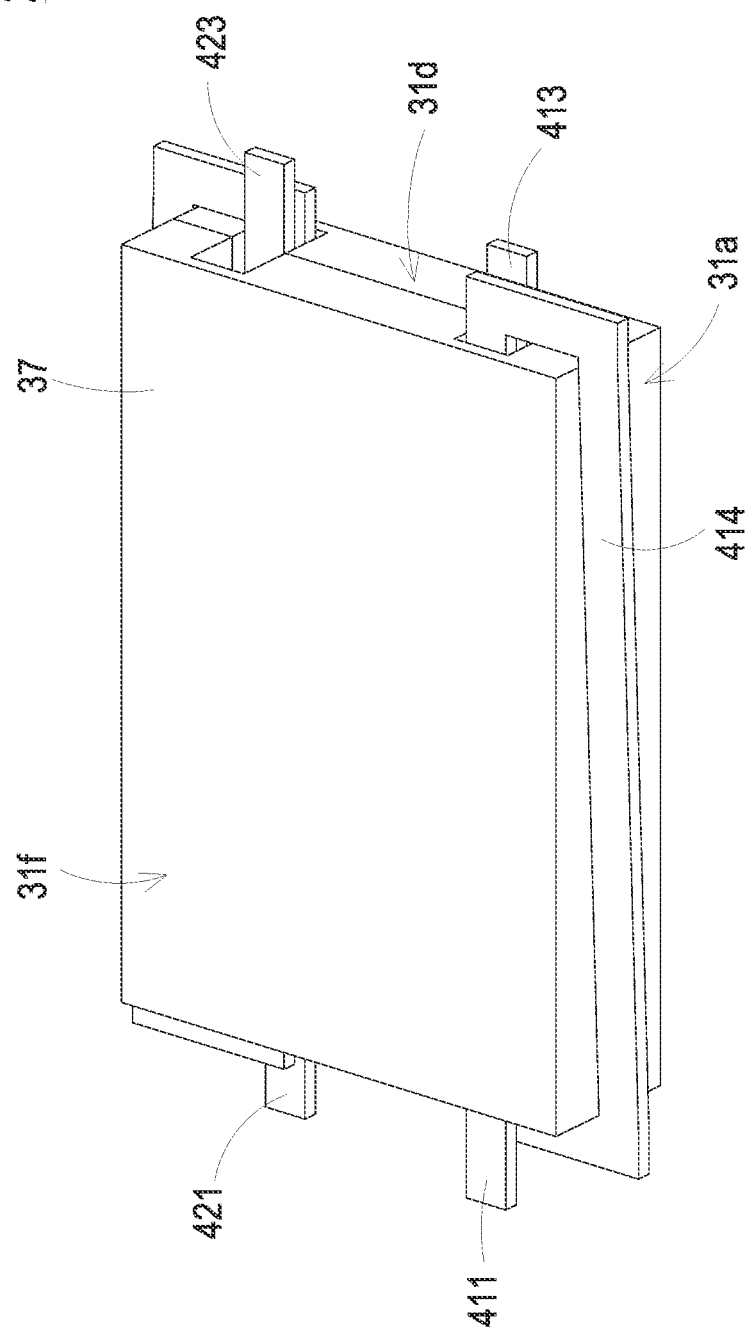
FIG. 11 is a schematic perspective view illustrating the structure of a magnetic device according to a fifth embodiment of the present disclosure.
Figure 12:
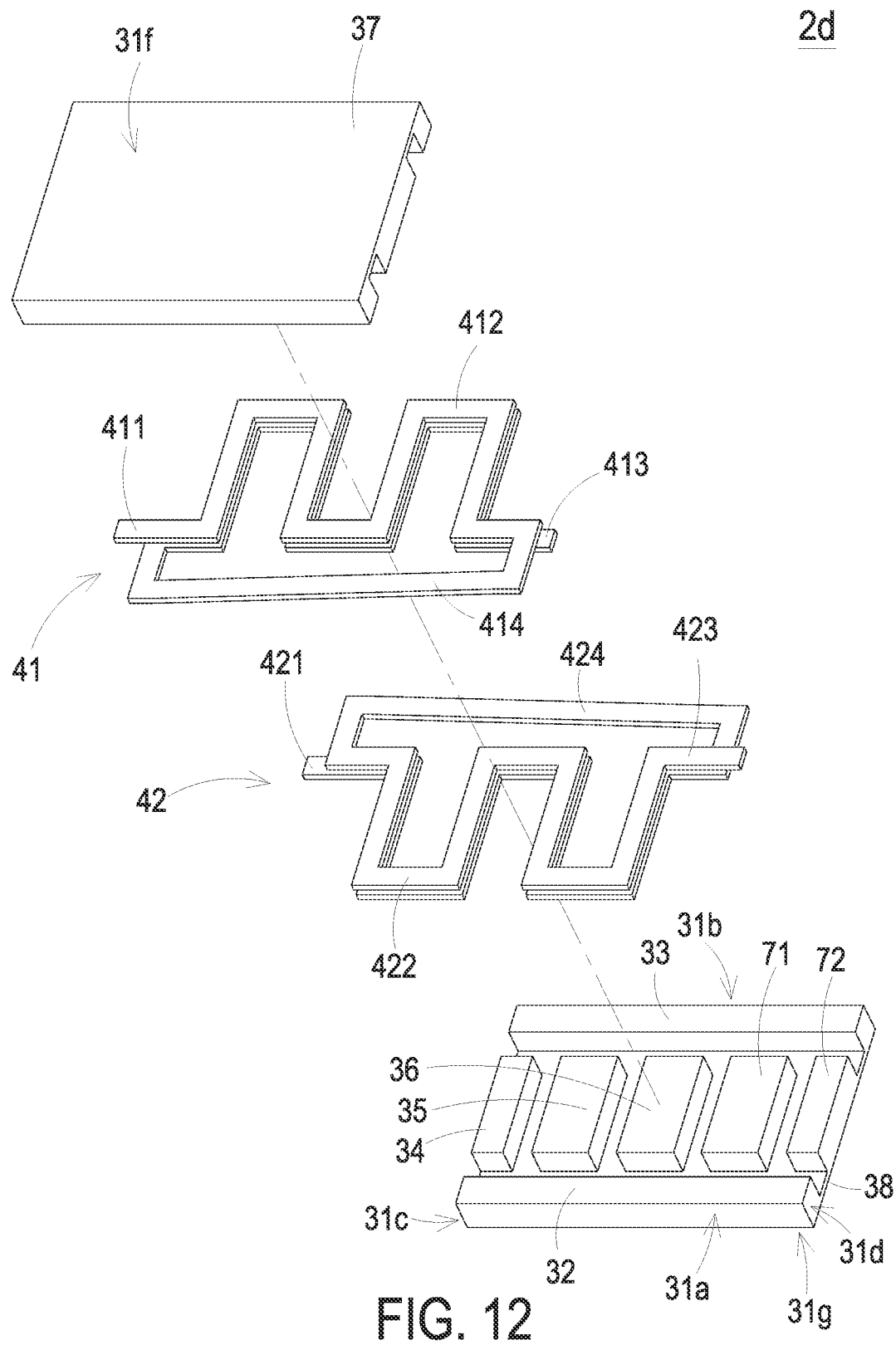
FIG. 12 is a schematic exploded view illustrating the magnetic device as shown in FIG. 11.

Please refer to FIGS. 11 and 12. FIG. 11 is a schematic perspective view illustrating the structure of a magnetic device according to a fifth embodiment of the present disclosure. FIG. 12 is a schematic exploded view illustrating the magnetic device as shown in FIG. 11. The magnetic device 2 as shown in FIGS. 2 and 3 includes the first coupled magnetic leg 34, the second coupled magnetic leg 35 and the third coupled magnetic leg 36. In comparison with the second magnetic device 2 as shown in FIGS. 2 and 3, the magnetic device 2d of this embodiment further includes a fourth coupled magnetic leg 71 and a fifth coupled magnetic leg 72. In this embodiment, the first coupled magnetic leg 34 is located beside the third lateral side 31c, and the fifth coupled magnetic leg 72 is located beside the fourth lateral side 31d. The first coupled magnetic leg 34, the second coupled magnetic leg 35, the third coupled magnetic leg 36, the fourth coupled magnetic leg 71 and the fifth coupled magnetic leg 72 are discretely and sequentially disposed, and disposed between the first common magnetic leg 32 and the second common magnetic leg 33.

The first input part 411 of the first winding 41 is disposed between the first common magnetic leg 32 and the first coupled magnetic leg 34. The first intermediate part 412 of the first winding 41 is disposed multiple times between the first coupled magnetic leg 34 and the second coupled magnetic leg 35, between the second common magnetic leg 33 and the second coupled magnetic leg 35, between the second coupled magnetic leg 35 and the third coupled magnetic leg 36, between the third coupled magnetic leg 36 and the first common magnetic leg 32, between the third coupled magnetic leg 36 and the fourth coupled magnetic leg 71, between the second common magnetic leg 33 and the fourth coupled magnetic leg 71, and between the fourth coupled magnetic leg 71 and the fifth coupled magnetic leg 72. Consequently, the DC current of the first winding 41 flows multiple times between the first coupled magnetic leg 34 and the second coupled magnetic leg 35, between the second common magnetic leg 33 and the second coupled magnetic leg 35, between the second coupled magnetic leg 35 and the third coupled magnetic leg 36, between the third coupled magnetic leg 36 and the first common magnetic leg 32, between the third coupled magnetic leg 36 and the fourth coupled magnetic leg 71, between the second common magnetic leg 33 and the fourth coupled magnetic leg 71, and between the fourth coupled magnetic leg 71 and the fifth coupled magnetic leg 72. In this embodiment, the first intermediate part 412 of the first winding 41 is disposed two times between the first coupled magnetic leg 34 and the second coupled magnetic leg 35, between the second common magnetic leg 33 and the second coupled magnetic leg 35, between the second coupled magnetic leg 35 and the third coupled magnetic leg 36, between the third coupled magnetic leg 36 and the first common magnetic leg 32, between the third coupled magnetic leg 36 and the fourth coupled magnetic leg 71, between the second common magnetic leg 33 and the fourth coupled magnetic leg 71, and between the fourth coupled magnetic leg 71 and the fifth coupled magnetic leg 72. The first output part 413 of the first winding 41 is disposed between the first common magnetic leg 32 and the fifth coupled magnetic leg 72.

The second input part 421 of the second winding 42 is disposed between the second common magnetic leg 33 and the first coupled magnetic leg 34. The second intermediate part 422 of the second winding 42 is disposed multiple times between the first coupled magnetic leg 34 and the second coupled magnetic leg 35, between the first common magnetic leg 32 and the second coupled magnetic leg 35, between the second coupled magnetic leg 35 and the third coupled magnetic leg 36, between the third coupled magnetic leg 36 and the second common magnetic leg 33, between the third coupled magnetic leg 36 and the fourth coupled magnetic leg 71, between the first common magnetic leg 32 and the fourth coupled magnetic leg 71, and between the fourth coupled magnetic leg 71 and the fifth coupled magnetic leg 72. Consequently, the DC current of the second winding 42 flows multiple times between the first coupled magnetic leg 34 and the second coupled magnetic leg 35, between the first common magnetic leg 32 and the second coupled magnetic leg 35, between the second coupled magnetic leg 35 and the third coupled magnetic leg 36, between the third coupled magnetic leg 36 and the second common magnetic leg 33, between the third coupled magnetic leg 36 and the fourth coupled magnetic leg 71, between the first common magnetic leg 32 and the fourth coupled magnetic leg 71, and between the fourth coupled magnetic leg 71 and the fifth coupled magnetic leg 72. In this embodiment, the second intermediate part 422 of the second winding 42 is disposed two times between the first coupled magnetic leg 34 and the second coupled magnetic leg 35, between the first common magnetic leg 32 and the second coupled magnetic leg 35, between the second coupled magnetic leg 35 and the third coupled magnetic leg 36, between the third coupled magnetic leg 36 and the second common magnetic leg 33, between the third coupled magnetic leg 36 and the fourth coupled magnetic leg 71, between the first common magnetic leg 32 and the fourth coupled magnetic leg 71, and between the fourth coupled magnetic leg 71 and the fifth coupled magnetic leg 72. The second output part 423 of the second winding 42 is disposed between the second common magnetic leg 33 and the fifth coupled magnetic leg 72.

In this embodiment, the first winding 41 includes at least one first connection part 414. Preferably but not exclusively, as shown in FIG. 12, the first winding 41 includes one first connection part 414. The first connection part 414 is disposed between the first common magnetic leg 32 and the first coupled magnetic leg 34, between the third lateral side 31c of the magnetic device 3, the first lateral side 31a of the magnetic device 3 and the fourth lateral side 31d of the magnetic device 3, and between the first common magnetic leg 32 and the fifth coupled magnetic leg 72. The first connection part 414 is connected between two first intermediate parts 412 of the first winding 41 which are connected end to end. The second winding 42 includes at least one second connection part 424. Preferably but not exclusively, as shown in FIG. 12, the second winding 42 includes one second connection part 424. The second connection part 424 is disposed between the second common magnetic leg 33 and the first coupled magnetic leg 34, between the third lateral side 31c of the magnetic device 3, the second lateral side 31b of the magnetic device 3 and the fourth lateral side 31d of the magnetic device 3, and between the second common magnetic leg 33 and the fifth coupled magnetic leg 72. The second connection part 424 is connected between two first intermediate parts 422 of the second winding 42 which are connected end to end.

In the embodiment of FIG. 12, each winding is equivalent to a coupled inductor with two turns. The concepts may be applied to the coupled inductor with more than two turns. In comparison with the coupled inductor of FIG. 3 with the single-turn windings, the coupled inductor with more than two turns has increased inductance, increased saturation current or reduced core loss.

The relationships among the first winding 41, the second winding 42 and the associated magnetic legs may be described as the following rules. The first winding 41 is disposed between every two adjacent coupled magnetic legs, between every even-numbered coupled magnetic leg and the second common magnetic leg 33, and between every odd-numbered coupled magnetic leg and the first common magnetic leg 32. The second winding 42 is disposed between every two adjacent coupled magnetic legs, between every even-numbered coupled magnetic leg and the first common magnetic leg 32, and between every odd-numbered coupled magnetic leg and the second common magnetic leg 33. In case that the number of the coupled magnetic legs is odd, the first output part 413 of the first winding 41 is disposed between the last coupled magnetic leg and the first common magnetic leg 32, and the second output part 423 of the second winding 42 is disposed between the last coupled magnetic leg and the second common magnetic leg 33. In case that the number of the coupled magnetic legs is even, the first output part 413 of the first winding 41 is disposed between the last coupled magnetic leg and the second common magnetic leg 33, and the second output part 423 of the second winding 42 is disposed between the last coupled magnetic leg and the first common magnetic leg 32. In addition, the number of the overlap regions between the first winding 41 and the second winding 42 is equal to the number of the coupled magnetic legs minus 1.

Figure 13:
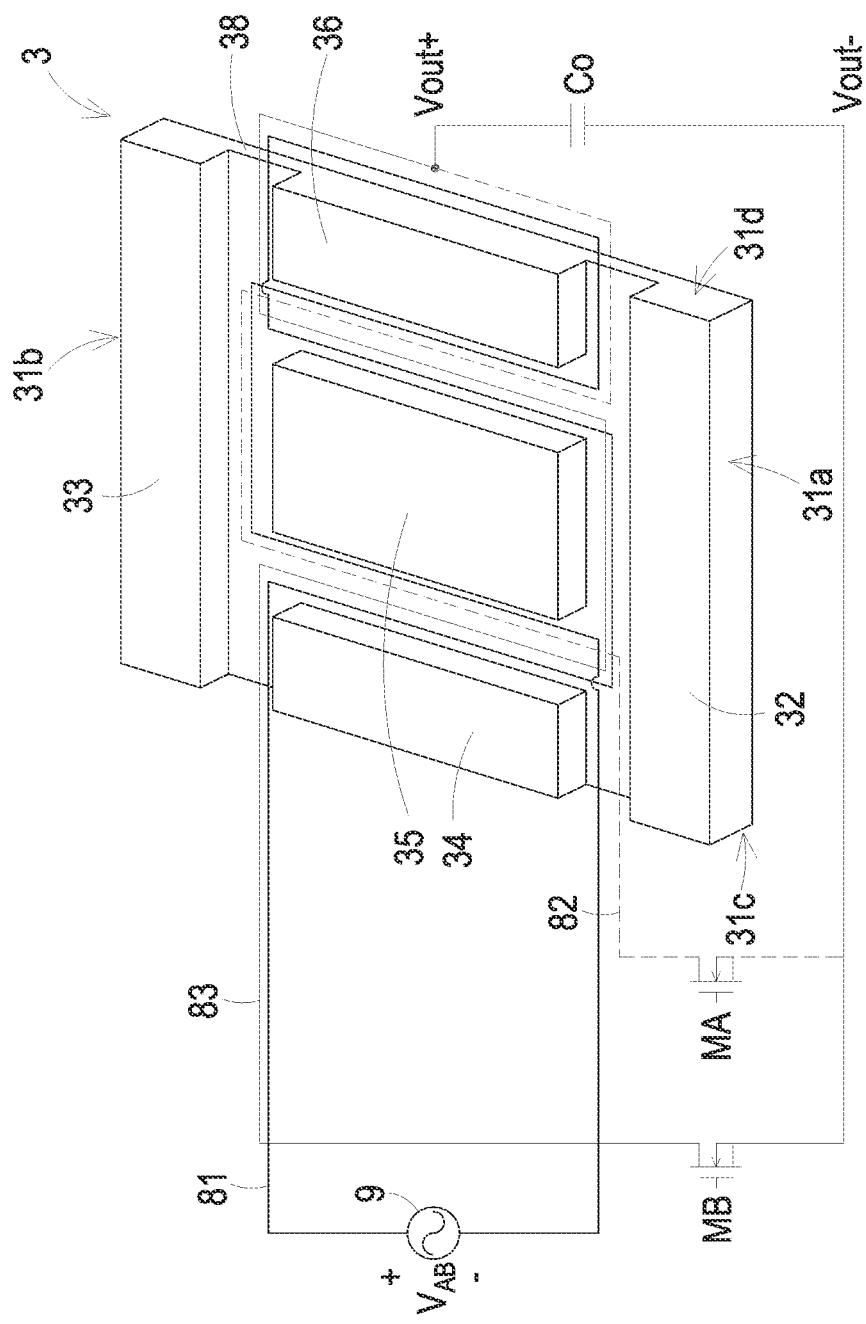
FIG. 13 schematically illustrates a power converter according to a sixth embodiment of the present disclosure.
Figure 14:
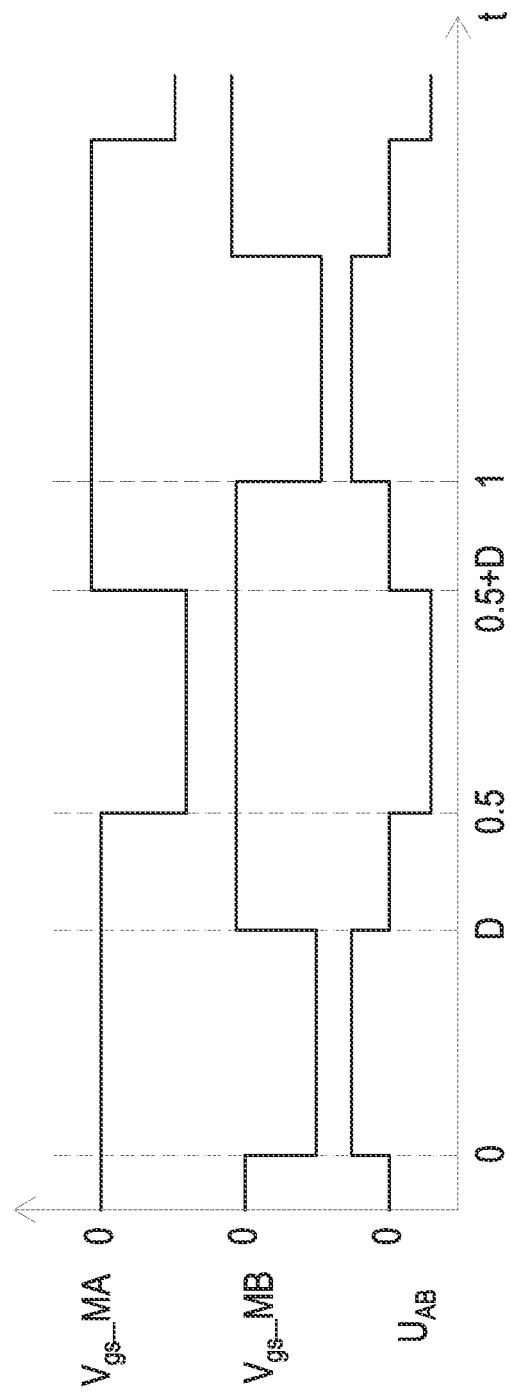
FIG. 14 is a schematic timing waveform diagram illustrating associated voltage signals for controlling the power converter as shown in FIG. 13.

FIG. 13 schematically illustrates a power converter according to a sixth embodiment of the present disclosure. FIG. 14 is a schematic timing waveform diagram illustrating associated voltage signals for controlling the power converter as shown in FIG. 13. Compared with the magnetic device 2 being formed as a coupled inductor, the magnetic device 2e of this embodiment is formed as a coupled transformer. The magnetic device 2e includes a primary winding 81, a first secondary winding 82 and a second secondary winding 83. The power converter further includes a first rectifying element MA, a second rectifying element MB and an output capacitor Co. For clearly describing the primary winding 81, the first secondary winding 82 and the second secondary winding 83, only the second magnetic cover 38 of the magnetic core assembly 3 is shown in FIG. 13 and the first magnetic cover of the magnetic core assembly 3 is not shown in FIG. 13. The primary winding 81, the first secondary winding 82 and the second secondary winding 83 are sequentially stacked over each other between the first magnetic cover and the second magnetic cover 38.

A first terminal of the primary winding 81 is connected to a first terminal of an external alternating voltage 9. A second terminal of the primary winding 81 is connected to a second terminal of the external AC voltage source 9. The external AC voltage source 9 provides an AC pulse voltage $U_{AB}$. Consequently, the voltage across the two terminals of the primary winding 81 is equal to the AC pulse voltage $U_{AB}$. The AC pulse voltage $U_{AB}$ is a two-level or three-level AC pulse voltage. The working mode of the external AC voltage source 9 to provide the AC pulse voltage $U_{AB}$ will be described as follows.

Please refer to FIG. 13. The primary winding 81 is disposed between the first coupled magnetic leg 34 and the second common magnetic leg 33, disposed between the first coupled magnetic leg 34 and the second coupled magnetic leg 35, disposed between the first common magnetic leg 32 and the second coupled magnetic leg 35, disposed between the second coupled magnetic leg 35 and the third coupled magnetic leg 36, disposed between the third coupled magnetic leg 36 and the second common magnetic leg 33, located beside an outer side of the fourth side 31d of the magnetic core assembly 3, disposed between the third coupled magnetic leg 36 and the first common magnetic leg 32, disposed between the second coupled magnetic leg 35 and the third coupled magnetic leg 36, disposed between the second coupled magnetic leg 35 and the second common magnetic leg 33, disposed between the first coupled magnetic leg 34 and the second coupled magnetic leg 35, and disposed between the first coupled magnetic leg 34 and the first common magnetic leg 32.

The input terminal of the first secondary winding 82 is connected to the first rectifying element MA. The output terminal of the first secondary winding 82 is connected to the positive output terminal Vout+ of the power converter (i.e., the first terminal of the output capacitor Co). The input terminal of the second secondary winding 83 is connected to the second rectifying element MB. The output terminal of the second secondary winding 83 is connected to the positive output terminal Vout+. The methods of winding the first secondary winding 82 and the second secondary winding 83 on the magnetic core assembly 3 are similar to the methods of winding the first winding 41 and the second winding 42 on the magnetic core assembly 3, and not redundantly described herein.

The first rectifying element MA and the second rectifying element MB are MOSFET transistors, diodes, GaN FET transistors or IGBT transistors. In the example of FIG. 13, the first rectifying element MA and the second rectifying element MB are MOSFET transistors. The drain terminal of the first rectifying element MA is connected to the input terminal of the first secondary winding 82. The source terminal of the first rectifying element MA is connected to the negative output terminal Vout− of the power converter (i.e., the second terminal of the output capacitor Co). The drain terminal of the second rectifying element MB is connected to the input terminal of the second secondary winding 83. The source terminal of the second rectifying element MB is connected to the source terminal of the first rectifying element MA and the negative output terminal Vout−. In case that the first rectifying element MA is a diode, the cathode of the first rectifying element MA is connected to the input terminal of the first secondary winding 82, and the anode of the first rectifying element MA is connected to the negative output terminal Vout−. In case that the second rectifying element MB is a diode, the cathode of the second rectifying element MB is connected to the input terminal of the second secondary winding 83, and the anode of the second rectifying element MB is connected to the negative output terminal Vout−.

Please refer to FIG. 14. The AC pulse voltage $U_{AB}$ is a three-level AC pulse voltage. In case that the AC pulse voltage $U_{AB}$ is positive, the first rectifying element MA is turned on in response to a turning-on signal, and the second rectifying element MB is turned off in response to a turning-off signal. In case that the AC pulse voltage $U_{AB}$ is zero, the first rectifying element MA is turned on in response to the turning-on signal, and the second rectifying element MB is turned on in response to the turning-on signal. In case that the AC pulse voltage $U_{AB}$ is negative, the first rectifying element MA is turned off in response to the turning-off signal, and the second rectifying element MB is turned on in response to the turning-on signal. In other words, the DC current on the first secondary winding 82 flows from the input terminal of the first secondary winding 82 to the output terminal of the first secondary winding 82, and the DC current on the second secondary winding 83 flows from the input terminal of the second secondary winding 83 to the output terminal of the second secondary winding 83. As mentioned above, the magnetic device with the primary winding 81, the first secondary winding 82 and the second secondary winding 83 is referred as a coupled transformer. In comparison with the coupled inductor, the coupled transformer has many advantages. For example, the ripple current of secondary winding is smaller, and the core loss of the middle leg is smaller. Moreover, the arrangement of the primary winding has many advantages. In case that the voltage gains of the coupled transformer and the coupled inductor are identical, the duty cycle of the coupled transformer is larger, and the volt-second product of the secondary winding is reduced. Moreover, the magnetic core is reduced, the effective current value is increased, and the conduction loss is reduced.

It is noted that the number of the coupled magnetic legs in the coupled transformer is not restricted.

From the above descriptions, the present disclosure provides the magnetic device and the power converter. The first intermediate part of the first winding and the second intermediate part of the second winding are disposed between the first coupled magnetic leg and the second coupled magnetic leg and between the second coupled magnetic leg and the third coupled magnetic leg. In other words, there are two overlap regions between the first winding and the second winding. When compared with the conventional magnetic device, the thicknesses of the magnetic covers of the magnetic device of the present disclosure are largely reduced, and the core loss of the magnetic device is reduced. Consequently, the magnetic device is slim and has low thermal resistance.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic device, comprising:
a first magnetic cover having a surface;
a second magnetic cover having a surface;
a first common magnetic leg disposed between the first magnetic cover and the second magnetic cover;
a second common magnetic leg opposed to the first common magnetic leg, and disposed between the first magnetic cover and the second magnetic cover;
N coupled magnetic legs discretely disposed between the first common magnetic leg and the second common magnetic leg, wherein the N coupled magnetic legs are disposed between the first magnetic cover and the second magnetic cover, and N is an integer greater than or equal to 3;
a first winding disposed between every two adjacent coupled magnetic legs, disposed between every even-numbered coupled magnetic leg and the second common magnetic leg, and disposed between every odd-numbered coupled magnetic leg and the first common magnetic leg, wherein the first winding comprises a first input part, at least one first intermediate part and a first output part, which are connected with each other sequentially, wherein the first input part is disposed between the first common magnetic leg and a first coupled magnetic leg of the N coupled magnetic legs, and the at least one first intermediate part is connected between the first input part and the first output part, wherein when N is odd, the first output part is disposed between an N-th coupled magnetic leg of the N coupled magnetic legs and the first common magnetic leg, wherein when N is even, the first output part is disposed between the N-th coupled magnetic leg of the N coupled magnetic legs and the second common magnetic leg; and
a second winding disposed between every two adjacent coupled magnetic legs, disposed between every odd-numbered coupled magnetic leg and the second common magnetic leg, and disposed between every even-numbered coupled magnetic leg and the first common magnetic leg, wherein the second winding comprises a second input part, at least one second intermediate part and a second output part, which are connected with each other sequentially, wherein the second input part is disposed between the second common magnetic leg and the first coupled magnetic leg, and the at least one second intermediate part is connected between the second input part and the second output part, wherein when N is odd, the second output part is disposed between the N-th coupled magnetic leg of the N coupled magnetic legs and the second common magnetic leg, wherein when N is even, the second output part is disposed between the N-th coupled magnetic leg of the N coupled magnetic legs and the first common magnetic leg.

2. The magnetic device according to claim 1, wherein a magnetic resistance of each of the first common magnetic leg and the second common magnetic leg is greater than three times a magnetic resistance of each of the N coupled magnetic legs.

3. The magnetic device according to claim 1, wherein a magnetic resistance of each of the first common magnetic leg and the second common magnetic leg is greater than five times a magnetic resistance of each of the N coupled magnetic legs.

4. The magnetic device according to claim 1, wherein all of the N coupled magnetic legs have no air gaps.

5. The magnetic device according to claim 1, wherein the first common magnetic leg, the second common magnetic leg and the N coupled magnetic legs have air gaps, wherein the air gap of each of the first common magnetic leg and the second common magnetic leg is longer than the air gap of each of the N coupled magnetic legs.

6. The magnetic device according to claim 5, wherein the first common magnetic leg, the second common magnetic leg and the N coupled magnetic legs have air gaps, wherein the air gap of the first common magnetic leg is disposed between the first common magnetic leg and the first magnetic cover, and/or the air gap of the first common magnetic leg is disposed between the first common magnetic leg and the second magnetic cover, and/or the air gap of the first common magnetic leg is disposed in a middle region of the first common magnetic leg, wherein the air gap of the second common magnetic leg is disposed between the second common magnetic leg and the first magnetic cover, and/or the air gap of the second common magnetic leg is disposed between the second common magnetic leg and the second magnetic cover, and/or the air gap of the second common magnetic leg is disposed in a middle region of the second common magnetic leg, wherein the air gap of each of the N coupled magnetic legs is disposed between the corresponding coupled magnetic leg and the first magnetic cover, and/or the air gap of each of the N coupled magnetic legs is disposed between the corresponding coupled magnetic leg and the second magnetic cover, and/or the air gap of each of the N coupled magnetic legs is disposed in a middle region of the corresponding coupled magnetic leg.

7. The magnetic device according to claim 1, wherein the magnetic device further comprises a main body, and the main body comprises a first surface, a second surface, a plurality of lateral walls and a conductive structure, wherein the first surface and the second surface are opposed to each other, the plurality of lateral walls are disposed between the first surface and the second surface, the first surface of the main body is located beside the first magnetic cover, and the second surface of the main body is located beside the second magnetic cover, wherein the first common magnetic leg, the second common magnetic leg and the N coupled magnetic legs are disposed within the main body, and disposed among the plurality of lateral walls, wherein the conductive structure is embedded in the main body, and the conductive structure is connected with the first winding and the second winding.

8. The magnetic device according to claim 7, wherein a distance between the first surface and the second surface of the main body is greater than a distance between the surface of the first magnetic cover and the surface of the second magnetic cover.

9. The magnetic device according to claim 7, wherein the magnetic device further comprises a plurality of conduction parts, wherein at least two of the plurality of conduction parts are respectively connected with the first input part of the first winding and the second input part of the second winding for a current flowing thereinto, and wherein at least one of the plurality of conduction parts is connected with the first output part of the first winding and the second output part of the second winding for a current flowing thereout.

10. The magnetic device according to claim 7, wherein the magnetic device further comprises a plurality of conduction parts, wherein at least two of the plurality of conduction parts are respectively connected with the first input part of the first winding and the second input part of the second winding for a current flowing thereinto, and wherein at least two of the plurality of conduction parts are respectively connected with the first output part of the first winding and the second output part of the second winding for a current flowing thereout.

11. The magnetic device according to claim 10, wherein the conduction parts for a current flowing thereinto are disposed on the first surface or the plurality of lateral walls of the main body, and the conduction parts for a current flowing thereout are disposed on the second surface or the plurality of lateral walls of the main body.

12. The magnetic device according to claim 7, wherein the magnetic device further comprises a plurality of conduction parts, the conduction parts are disposed on the first surface, the second surface or the plurality of lateral walls of the main body.

13. The magnetic device according to claim 1, wherein a material of the N coupled magnetic legs is different from a material of the first common magnetic leg and the second common magnetic leg.

14. The magnetic device according to claim 13, wherein the N coupled magnetic legs are made of high-permeability material, and the first common magnetic leg and the second common magnetic leg are made of low-permeability material.

15. The magnetic device according to claim 13, wherein the N coupled magnetic legs are made of ferrite, and the first common magnetic leg and the second common magnetic leg are made of iron powder, wherein a closed loop is defined by the first coupled magnetic leg, the N-th coupled magnetic leg, the first magnetic cover and the second magnetic cover, and portions of the first magnetic cover and the second magnetic cover corresponding to the closed loop are made of ferrite or high-permeability iron powder.

16. The magnetic device according to claim 1, wherein a DC current on the first winding flows through the first input part, the at least one first intermediate part and the first output part sequentially, and a DC current on the second winding flows through the second input part, the at least one second intermediate part and the second output part sequentially.

17. The magnetic device according to claim 1, wherein the first output part of the first winding and the second output part of the second winding are connected with each other, and a node between the first output part and the second output part of the second winding is located beside a side of the N-th coupled magnetic leg away from the first coupled magnetic leg.

18. The magnetic device according to claim 1, wherein a first AC voltage is applied between the first input part and the first output part of the first winding, and a second AC voltage is applied between the second input part and the second output part of the second winding, wherein a phase difference between the first AC voltage and the second AC voltage is in a range between 150 and 210 degrees.

19. The magnetic device according to claim 1, wherein a total cross-sectional area of the first common magnetic leg and the second common magnetic leg is greater than a total cross-sectional area of the N coupled magnetic legs.

20. The magnetic device according to claim 1, wherein a total cross-sectional area of the first common magnetic leg and the second common magnetic leg is smaller than or equal to a total cross-sectional area of the N coupled magnetic legs.

21. The magnetic device according to claim 1, wherein a cross-sectional area of the first common magnetic leg is substantial equal to a cross-sectional area of the second common magnetic leg, and a cross-sectional area of the first coupled magnetic leg is substantial equal to a cross-sectional area of the N-th coupled magnetic leg.

22. The magnetic device according to claim 1, wherein the first winding and the second winding are copper bars, or the first winding and the second winding are copper sheets or copper bars that are formed in a printed circuit board, wherein the magnetic device further comprises an insulation medium, and the first winding and the second winding are isolated from each other through the insulation medium.

23. The magnetic device according to claim 1, wherein each of the first common magnetic leg, the second common magnetic leg, the first winding, the second winding and the second coupled magnetic leg is in mirror symmetry with respect to a symmetric line, and the first coupled magnetic leg and the Nth coupled magnetic leg are symmetric to each other with respect to the symmetric line.

24. The magnetic device according to claim 1, wherein the first winding comprises a plurality of first intermediate parts, wherein a current of the first winding flows multiple times between each of the N coupled magnetic legs and the adjacent one of the N coupled magnetic legs; and wherein the second winding comprises a plurality of second intermediate parts, wherein a current of the second winding flows multiple times between each of the N coupled magnetic legs and the adjacent one of the N coupled magnetic legs.

25. The magnetic device according to claim 24, wherein the first winding further comprises at least one first connection part, wherein the at least one first connection part surrounds portion of the first common magnetic leg, and is connected between two of the first intermediate parts which are connected end to end; and wherein the second winding further comprises at least one second connection part, wherein the at least one second connection part surrounds portion of the second common magnetic leg, and is connected between two of the second intermediate parts which are connected end to end.

26. The magnetic device according to claim 1, wherein the first common magnetic leg comprises a plurality of first sub-legs, and the second common magnetic leg comprises a plurality of second sub-legs, wherein the plurality of first sub-legs are discretely disposed, and the plurality of second sub-legs are discretely disposed.

27. The magnetic device according to claim 1, wherein the magnetic device comprises a primary winding, and the primary winding is disposed between every two adjacent coupled magnetic legs, disposed between each coupled magnetic leg and the first common magnetic leg, and disposed between each coupled magnetic leg and the second common magnetic leg, wherein a turn number of the primary winding wound on each of the second coupled magnetic leg to (N−1)-th coupled magnetic leg is at least 1.

* * * * *